«12» United States Patent
Kawasaki

(10) Patent No.: US 8,193,855 B2
(45) Date of Patent: Jun. 5, 2012

(54) SEMICONDUCTOR DEVICE AND POWER CONTROL METHOD USED FOR SAME

(75) Inventor: Kenichi Kawasaki, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 114 days.

(21) Appl. No.: 12/893,056

(22) Filed: Sep. 29, 2010

(65) Prior Publication Data
US 2011/0074472 A1     Mar. 31, 2011

(30) Foreign Application Priority Data

Sep. 30, 2009    (JP) ................................ 2009-227113

(51) Int. Cl.
     *G05F 1/10*        (2006.01)

(52) U.S. Cl. ........................................ 327/546; 327/534

(58) Field of Classification Search ................. 327/403, 327/404, 534, 545, 546
See application file for complete search history.

(56) References Cited

U.S. PATENT DOCUMENTS

| 6,118,325 | A | 9/2000 | Nakamura |
| 6,643,208 | B2 * | 11/2003 | Yamagata et al. ............. 365/226 |
| 7,579,900 | B2 * | 8/2009 | Durbaum ...................... 327/513 |
| 8,120,410 | B2 * | 2/2012 | Meijer et al. .................. 327/534 |
| 2008/0066035 | A1 | 3/2008 | Asao |

FOREIGN PATENT DOCUMENTS

| JP | 11-214978 A | 8/1999 |
| JP | 2007-267162 A | 10/2007 |
| JP | 2008-65732 A | 3/2008 |

* cited by examiner

*Primary Examiner* — Jeffrey Zweizig
(74) *Attorney, Agent, or Firm* — Fujitsu Patent Center

(57) ABSTRACT

A semiconductor device includes an internal circuit; a plurality of power switches arranged in parallel configured to supply a current to the internal circuit; an instruction circuit configured to output a instruction signal for controlling power supply to the internal circuit; a variation detection circuit configured to detect the current and to output a detection result; and a logic circuit configured to control a timing when the plurality of power switches becomes a conducting state in accordance with the detection result and the instruction signal.

14 Claims, 22 Drawing Sheets

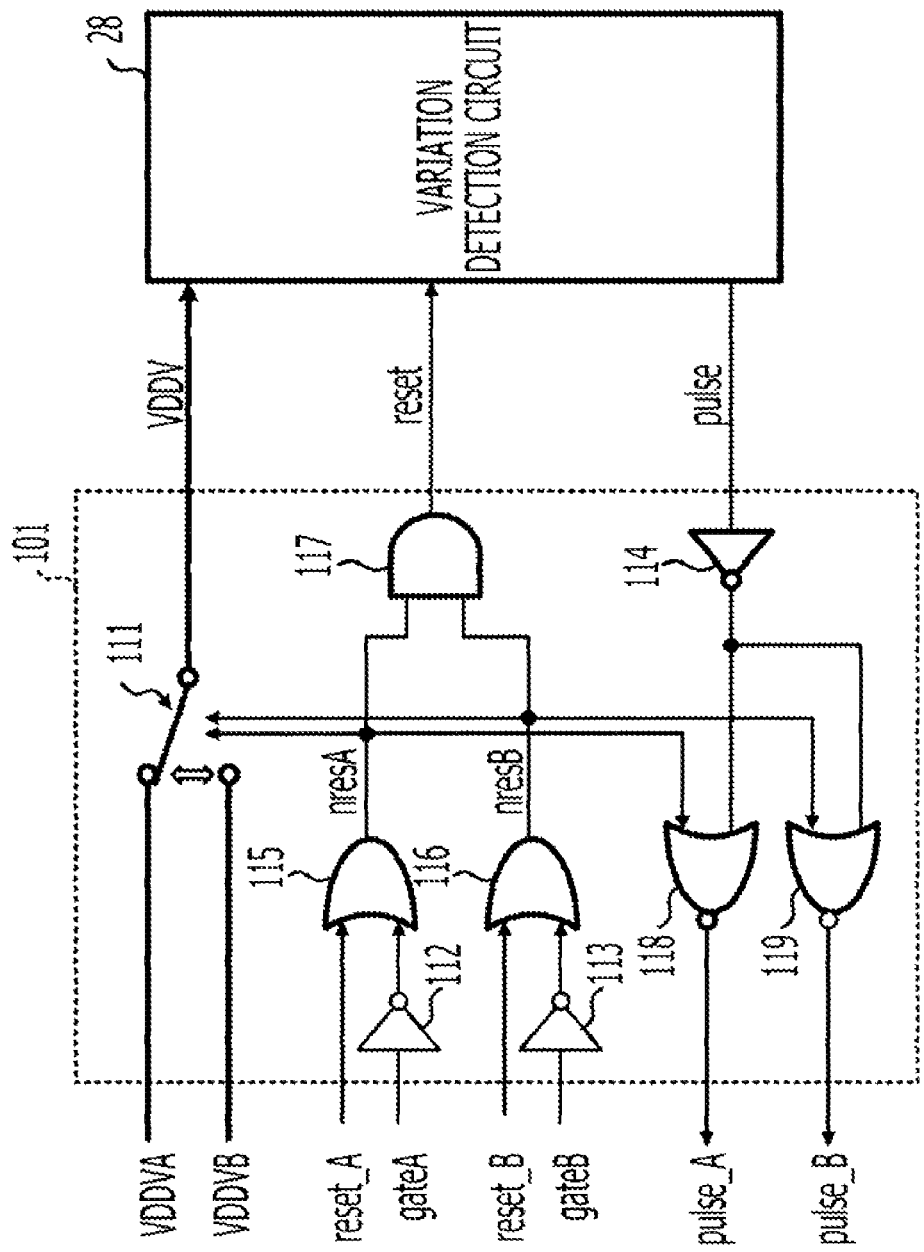

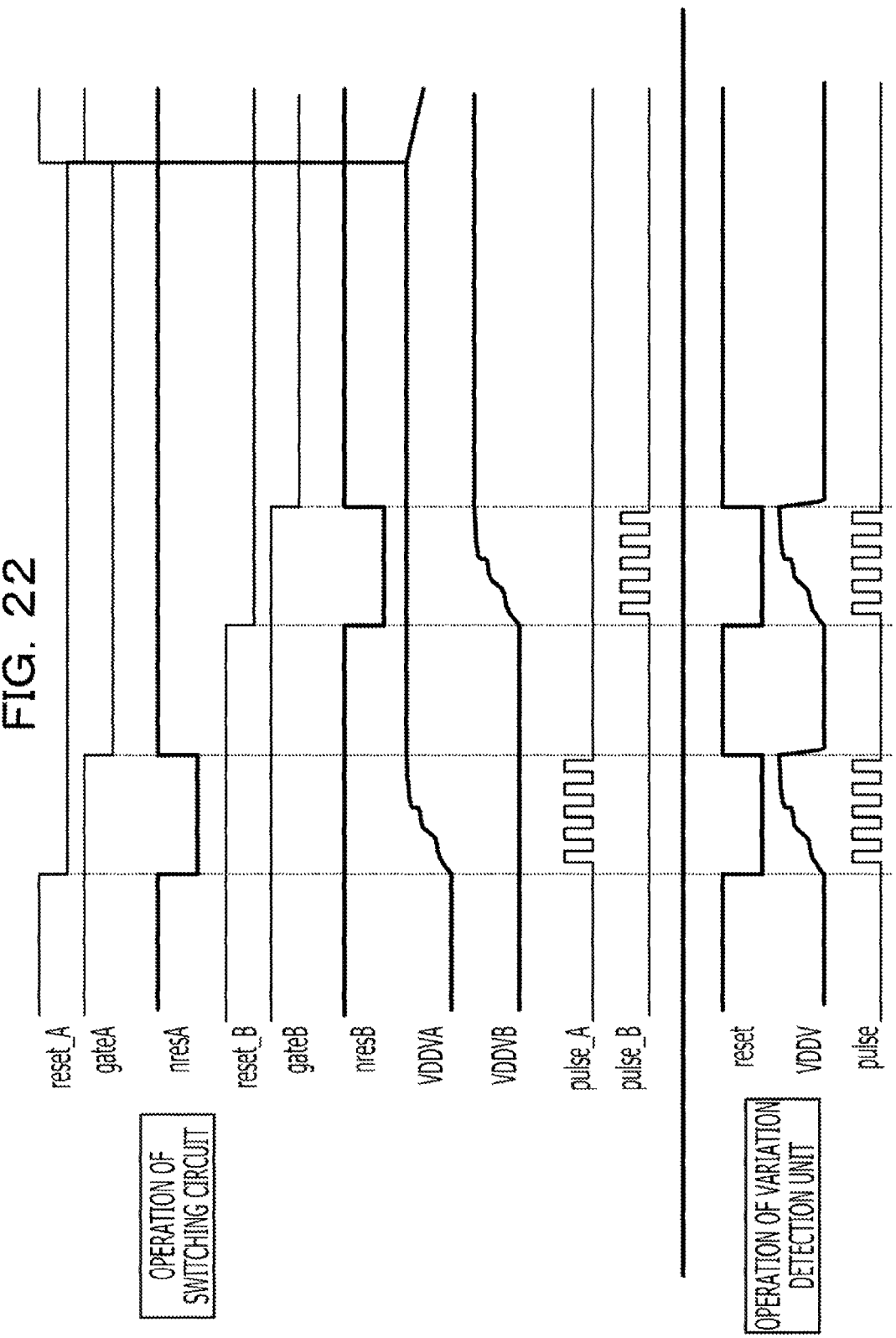

SEMICONDUCTOR DEVICE AND POWER CONTROL METHOD USED FOR SAME

CROSS-REFERENCE TO RELATED APPLICATIONS

This application is based upon and claims the benefit of priority of Japanese Patent Application No. 2009-227113, filed on Sep. 30, 2009, the entire contents of which are incorporated herein by reference.

BACKGROUND

1. Field

The embodiments discussed herein relate to a semiconductor device including a power control mechanism.

2. Description of Related Art

A large-scale integrated (LSI) circuit including a power down function turns off the power of an unused circuit block of a plurality of internal circuit blocks to decrease a leakage current.

Related art is disclosed in Japanese Laid-open Patent Publication No. 2008-65732, Japanese Laid-open Patent Publication No. 2007-267162, Japanese Laid-open Patent Publication No. H11-214978, and so forth.

SUMMARY

According to one aspect of the embodiments, a semiconductor device includes an internal circuit; a plurality of power switches arranged in parallel configured to supply a current to the internal circuit; an instruction circuit configured to output a instruction signal for controlling power supply to the internal circuit; a variation detection circuit configured to detect the current and to output a detection result; and a logic circuit configured to control a timing when the plurality of power switches become a conducting state in accordance with the detection result based on the instruction signal.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIG. 21 illustrates an exemplary switching circuit;
and
FIG. 22 illustrates an exemplary operation of a switching circuit and a variation detection circuit.

DESCRIPTION OF EMBODIMENTS

Figure 1:
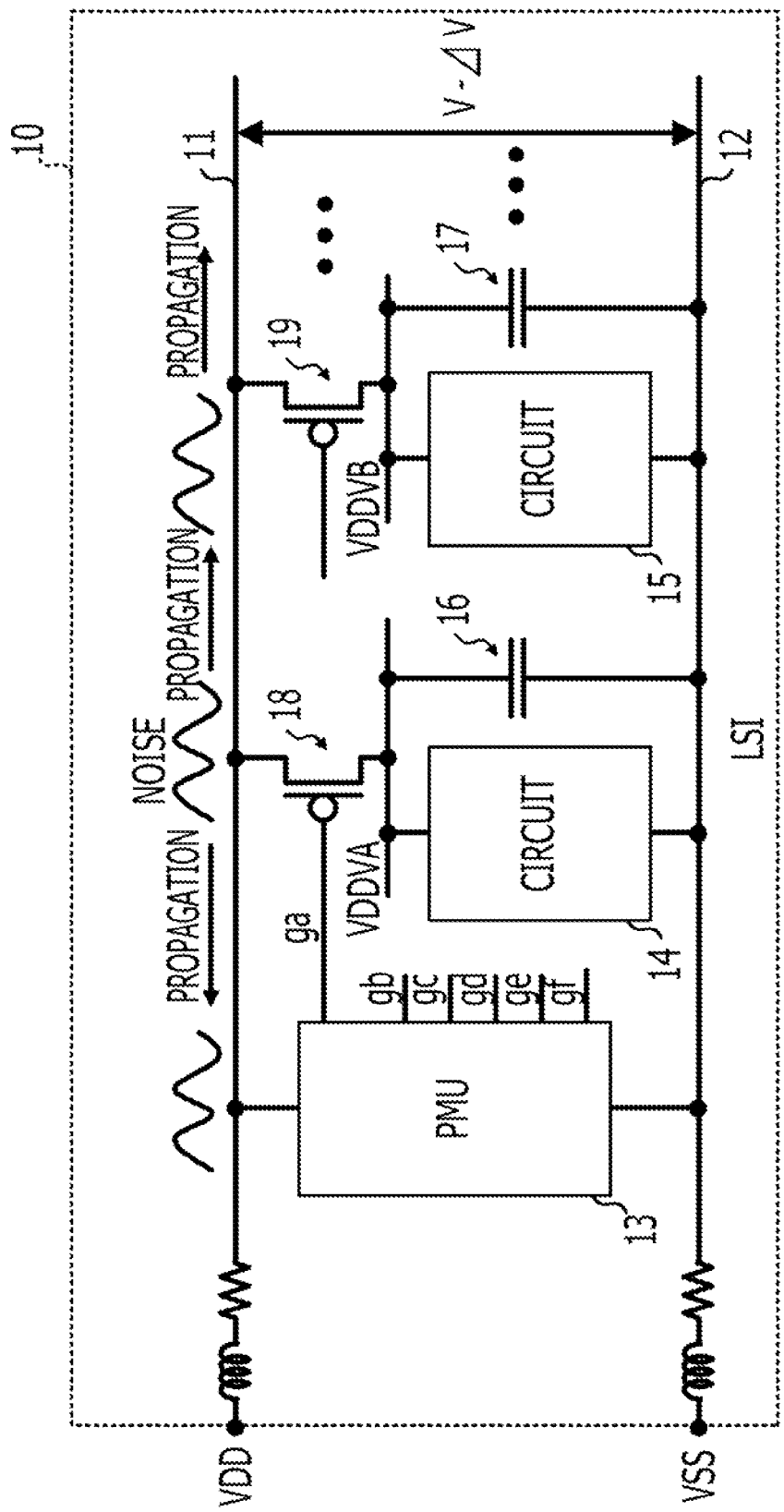
FIG. 1 illustrates an exemplary semiconductor device.

FIG. 1 illustrates an exemplary semiconductor integrated circuit. The semiconductor integrated circuit 10 includes high-side power wiring 11, low-side power wiring 12, a power management unit (PMU) 13, circuit blocks 14 and 15, stabilization capacitors 16 and 17, and p-channel metal-oxide semiconductor (PMOS) transistors 18 and 19 that are provided as power switches. The power supply for the circuit block 14 is controlled based on a gate control signal ga applied to the gate of the PMOS transistor 18.

When the power supply for the circuit block 14 is stopped, the electric charges of the stabilization capacitor 16 and electric charges inside the circuit block 14 are discharged via the path of a leakage current. Consequently, a voltage VDDVA may be reduced to a voltage near a ground voltage VSS. When the power supply for the circuit block 14 is started at that time, a large amount of rush current is generated to charge the internal capacitance of the circuit block 14 and the stabilization capacitor 16, so that a power noise (dynamic IR-drop) may occur in the high-side power wiring 11.

When the size of the PMOS transistor 18, such as the gate width is small, the amount of rush current may be reduced because the amount of current transmitted to the PMOS transistor 18 is small. Since the current consumed by the circuit block 14, which corresponds to the leakage current, is not supplied, each of the circuit block 14 and the stabilization capacitor 16 may not be charged to a certain voltage. Since the amount of rush current is increased with an increase in the size of the PMOS transistor 18, the value of $\Delta V$ may exceed a tolerable level. When the size of the PMOS transistor 18 is further increased, the input capacitance of the gate of the PMOS transistor 18 is increased and the waveform of the gate control signal ga becomes dull. Consequently, the amount of rush current may be reduced due to a decrease in the switching speed.

The method of making the waveform of the gate control signal dull includes a method of increasing the gate capacitance of a transistor, a method of adding a large capacity to the gate, a method of decreasing the power of driving a buffer driving the gate control signal, and so forth.

Figure 2:
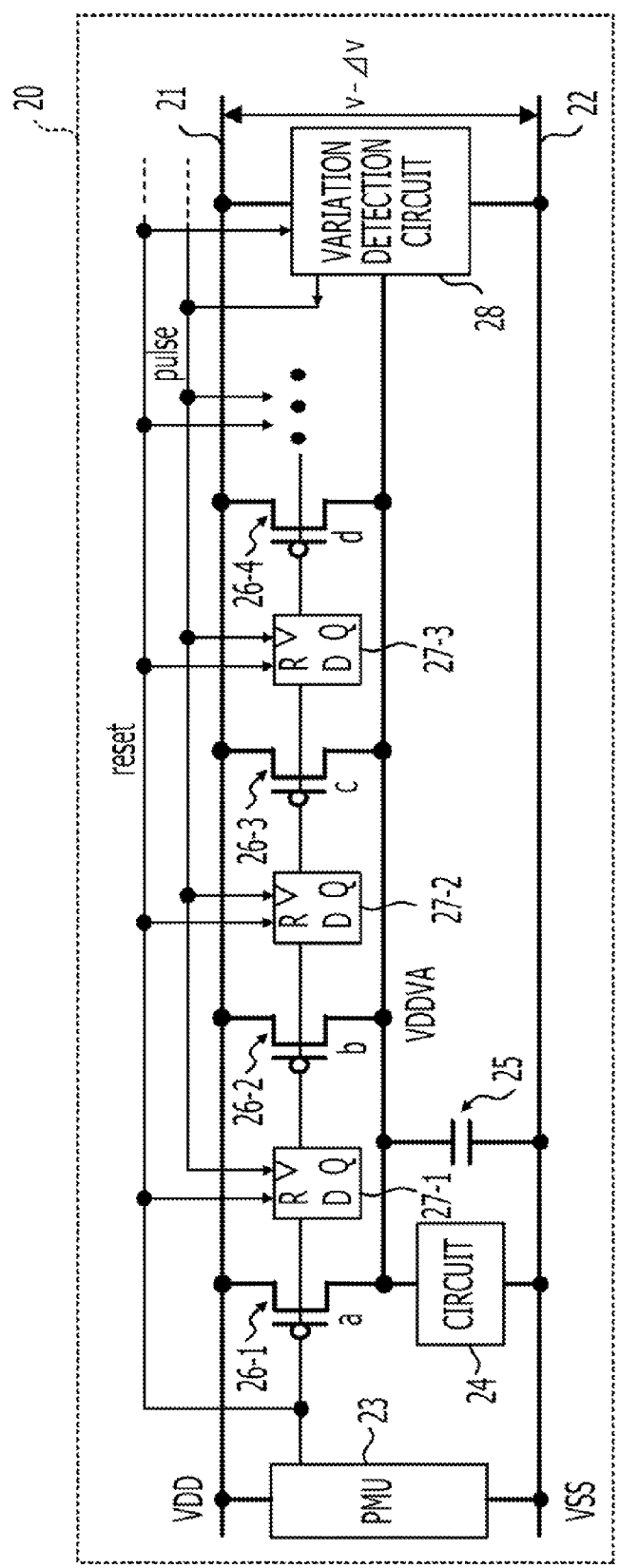
FIG. 2 illustrates an exemplary semiconductor device.

FIG. 2 illustrates an exemplary semiconductor device. A semiconductor integrated circuit 20 includes high-side power wiring 21, low-side power wiring 22, a PMU 23, a circuit block 24, a stabilization capacitor 25, PMOS transistors 26-1, 26-2, 26-3, and 26-4, flip-flops 27-1, 27-2, and 27-3, and a variation detection unit 28. Each of the PMOS transistors 26-1 to 26-4 and the flip-flops 27-1 to 27-3 may perform the power control, and the number of each of the PMOS transistors and the flip-flops may be arbitrarily determined. The semiconductor integrated circuit 20 may include a circuit block different from the circuit block 24 and the different circuit block may include a power control circuit similar to the circuit block 24.

The stabilization capacitor 25 configured to stabilize the power voltage of the circuit block 24 is provided between a high potential-power voltage side and a low potential-power voltage side which supplies a corresponding power supply voltage to the circuit block 24 respectively. The PMOS transistors 26-1 to 26-4 including a power switch are provided on the high potential-power voltage side of the circuit block 24. The power management unit 23 and the flip-flops 27-1 to 27-3 are provided to control the power supply for the circuit block 24 based on gate control signals a, b, c, and d that are applied to the individual gates of the PMOS transistors 26-1 to 26-4.

The PMOS transistors 26-1 to 26-4 are provided for parallel paths that supply a current to the circuit block 24, and each of the PMOS transistors 26-1 to 26-4 includes a power switch. The power management unit 23 issues an instruction for supplying power to the circuit block 24. The variation detection circuit 28 detects whether or not a current supplied to the circuit block 24 via the PMOS transistors 26-1 to 26-4 is in a steady state and outputs a detection result. The variation detection circuit 28 outputs a signal indicating whether or not the value of the temporal change rate of a voltage VDDVA charged to the circuit block 24 or the stabilization capacitor 25 is equal to a certain value or less, as a detection result. The flip-flops 27-1 to 27-3 bring the PMOS transistors 26-2 to 26-4 into conduction in sequence in response to the power supply instruction issued from the PMU 23 to gradually increase the amount of power supplied to the circuit block 24. The time when the PMOS transistors 26-2 to 26-4 are brought into conduction is controlled based on the detection result from the variation detection circuit 28.

When the power management unit 23 asserts the gate control signal to a low level, the PMOS transistor 26-1 is brought into conduction and supplies a current to the circuit block 24. A current flowing through the PMOS transistor 26-1 includes a charge current provided to charge the internal capacitance of the circuit block 24 and the stabilization capacitor 25 such as the rush current, and a current consumed by the circuit block 24 such as a steady-state current for supplying a leakage current. When the capacitance charging is finished, the charge current disappears and the charging voltage VDDVA is not changed. The steady-state current may depend on the VDDVA level. As the charging voltage VDDVA is increased, the amount of current consumed by the circuit block 24 and the amount of the steady-state current is increased. When the charging is finished and no more change in the charging voltage VDDVA occurs, the charge current disappears and only the steady-state current flows through the PMOS transistor 26-1. The amount of current flowing through the PMOS transistor 26-1 becomes a constant value in the steady state. When the current flowing through the PMOS transistor 26-1 enters the steady state, a power noise ΔV caused by the rush current disappears. Therefore, the subsequent PMOS transistor 26-2 may be brought into conduction. In FIG. 2, the variation detection circuit 28 asserts an output signal pulse when the value of the temporal change rate of the charging voltage VDDVA becomes equal to a certain value or less. For example, when the charging voltage VDDVA is not changed and only the steady-state current flows through the PMOS transistor 26-1, a pulse signal pulse is generated. The flip-flop 27-1 captures the low-level signal of an input D in response to the pulse signal pulse and the gate control signal b of an input Q is asserted to a low level. The PMOS transistor 26-2 is brought into conduction. Likewise, the PMOS transistors may be brought into conduction in sequence. Each time the detection result supplied from the variation detection circuit 28 indicates a change of a current from the non-steady state to the steady state, the flip-flops 27-1 to 27-3 increase the conducting PMOS transistors. Although the increase number may be one, a plurality of the PMOS transistors may be brought into conduction contemporaneously when the value of a noise caused by the rush current falls within a tolerable range.

Figure 3:
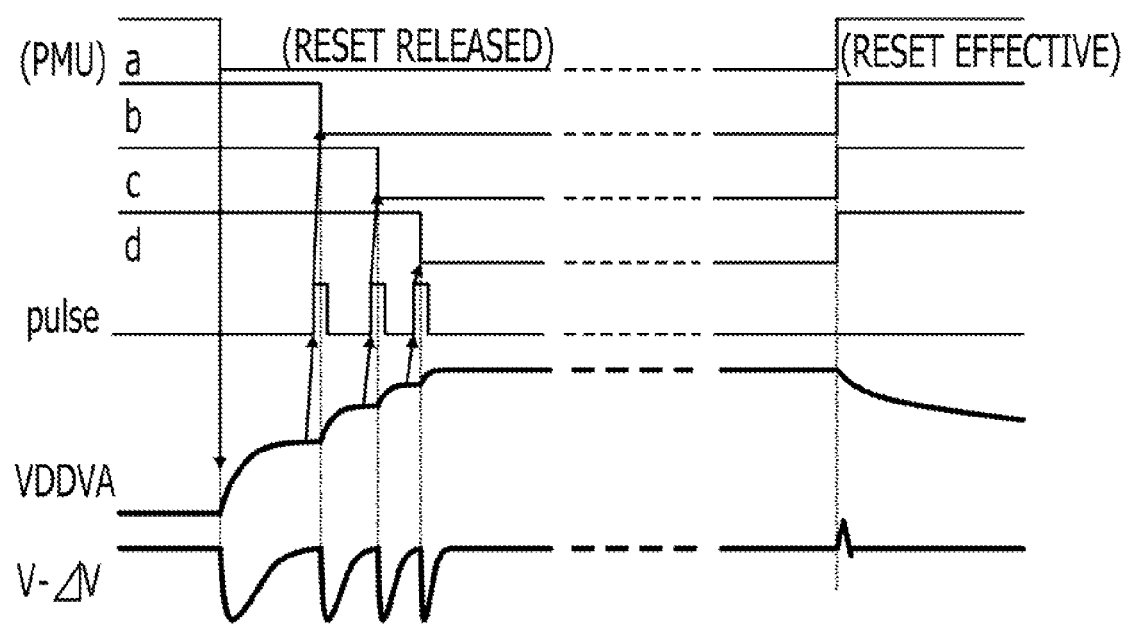
FIG. 3 illustrates an exemplary power supply operation.

FIG. 3 illustrates an exemplary power supply operation. A time chart illustrated in FIG. 3 may illustrate a start operation for supplying power to the circuit block 24. When the circuit block 24 is in the power shutdown state, the power management unit 23 asserts the gate control signal to a low level. The PMOS transistor 26-1 is brought into conduction based on the low-level gate control signal a, and the reset of each of the flip-flops 27-1 to 27-3 and the variation detection circuit 28 is released so that each of the flip-flops 27-1 to 27-3 and the variation detection circuit 28 is activated. The supply potential VDDVA of the circuit block 24 starts to increase based on a current flowing through the conducting PMOS transistor 26-1. A voltage V-ΔV provided between the high-side power wiring 21 and the low-side power wiring 22 may decrease. The voltage drop may occur due to a current flowing through the single conducting PMOS transistor 26-1. Since the current amount is small, the voltage drop may have a small width. The voltage VDDVA may become saturated to a potential at which a current, which is supplied by the PMOS transistor 26-1, and a current, which is consumed by the circuit block 24 when the VDDVA-potential is supplied, are in balance. When the VDDVA potential increase becomes saturated, the value of a current flowing into the circuit block 24 becomes a steady-state constant value and the current may not contribute to the power noise ΔV. The variation detection circuit 28 detects that the VDDVA potential variation becomes saturated, for example, when the power noise ΔV is reduced, and outputs a one-shot detection pulse signal pulse. The flip-flop 27-1 asserts the gate control signal b to a low level in response to the pulse signal pulse and the PMOS transistor 26-2 of the subsequent stage is brought into conduction. A new rush current for charging the circuit block 24 starts to flow so that the voltage VDDVA may be increased again. The voltage VDDVA may become saturated to a potential at which a current, which is supplied to the PMOS transistors 26-1 and 26-2, and a current, which is consumed by the circuit block 24 when the VDDVA-potential time is supplied, are in balance. The variation detection circuit 28 detects that the VDDVA potential variation becomes saturated, for example, when the power noise ΔV is reduced, and outputs a one-shot detection pulse signal pulse. The flip-flop 27-2 asserts the gate control signal c to a low level in response to the pulse signal pulse and the PMOS transistor 26-3 of the subsequent stage is brought into conduction. When the above-described process is repeated and the PMOS transistors having a size corresponding to a current consumed by the circuit block 24 are brought into conduction, the power startup is finished.

When the power shutdown operation is performed, the power management unit 23 asserts the gate control signal to a high level, as a power shutdown instruction. The flip-flops 27-1 to 27-3 are reset and the input Q becomes a high level and the PMOS transistors 26-1 to 26-4 are brought into non-conduction.

Figure 4:
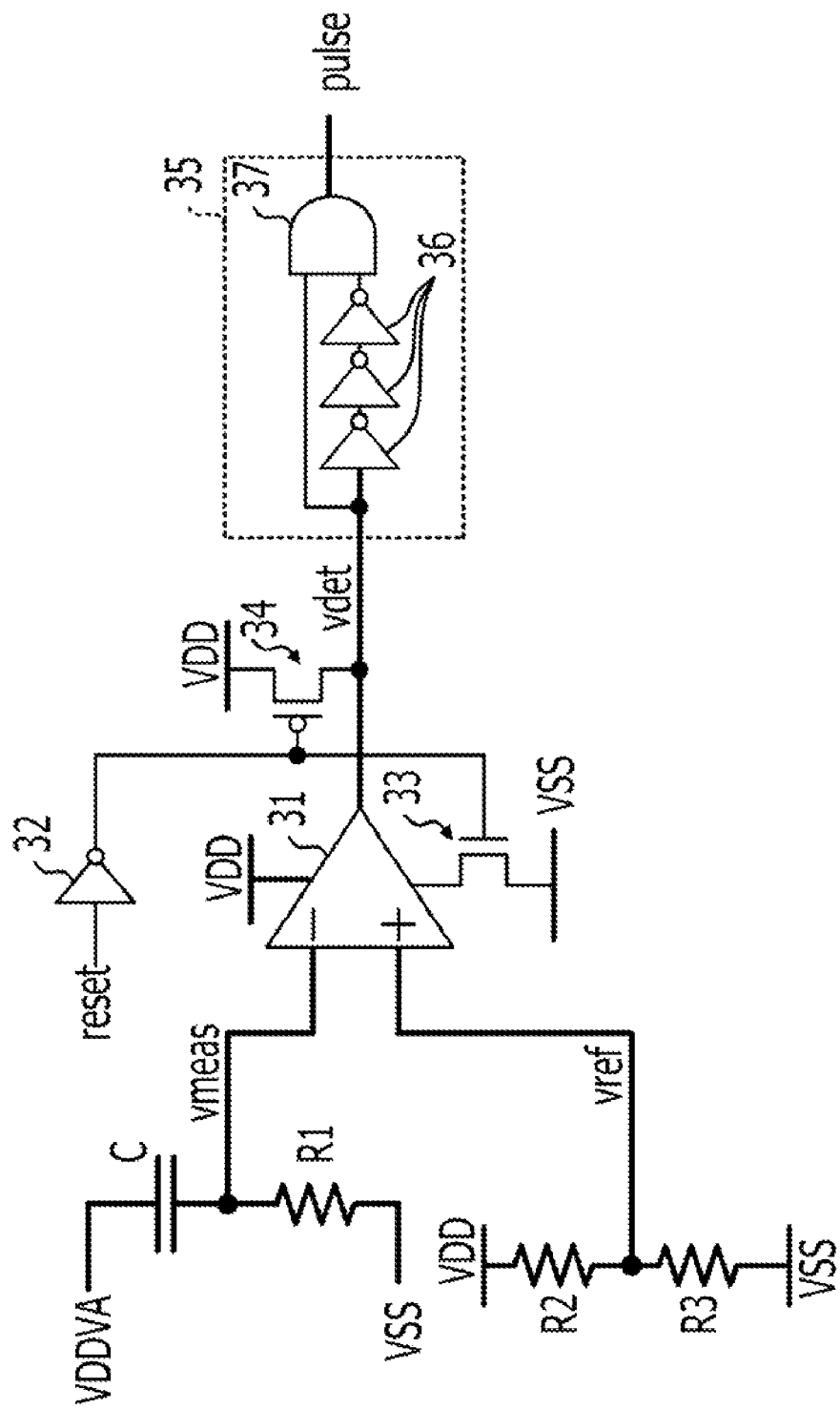
FIG. 4 illustrates an exemplary variation detection circuit.

FIG. 4 illustrates an exemplary variation detection circuit. The variation detection circuit 28 illustrated in FIG. 4 includes a comparator 31, an inverter 32, an n-channel metal-oxide semiconductor (NMOS) transistor 33, a PMOS transistor 34, a one-shot pulse generator 35, a capacitance element C, and resistor elements R1, R2, and R3. The temporal change rate of the voltage VDDVA may be detected based on when a voltage vmeas at a connection point between the capacitor element C and the resistor element R1 is changed from the voltage VDDVA in accordance with the time constant of the capacitor element C and the resistor element R1. A reference voltage vref is generated by the resistor elements R2 and R3. The comparator 31 compares the voltage vmeas with the reference voltage vref. The one-shot pulse generator 35 includes a plurality of inverters 36 and an AND circuit 37, and generates a pulse signal having a certain width in response to the rising transition of an output signal vdet of the comparator 31. When the reset signal reset, such as the gate control signal a illustrated in FIG. 2, is asserted to a low level, the NMOS transistor 33 is brought into conduction so that the comparator 31 is activated and the reset state of the variation detection unit 28 is released.

Figure 5:
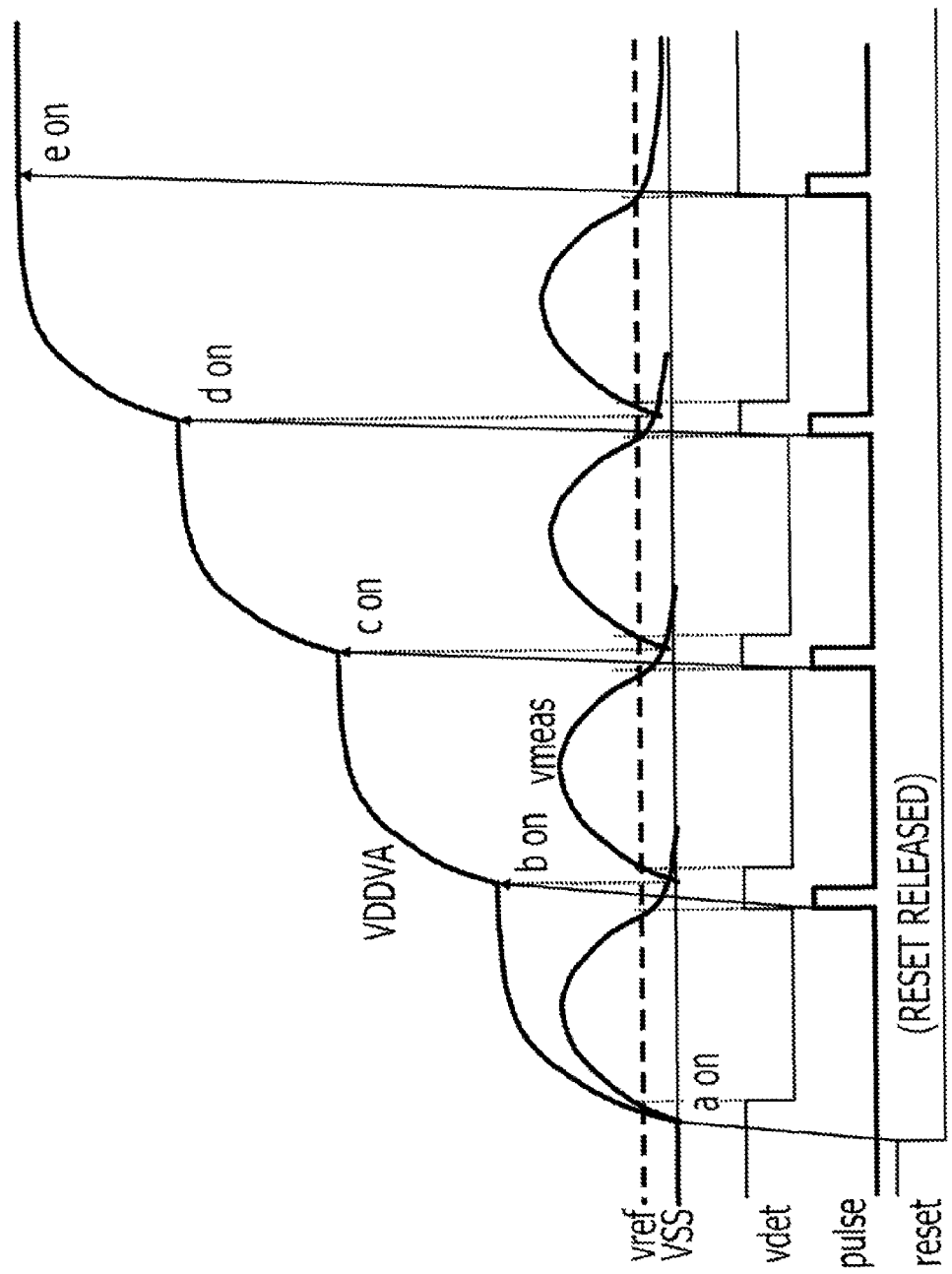
FIG. 5 illustrates an exemplary operation of an operation detection circuit.

FIG. 5 illustrates an exemplary operation of an operation detection circuit. The operation detection circuit may be the variation detection unit 28 illustrated in FIG. 4. When the voltage VDDVA is increased at a high increase rate relative to the time, such as the change rate, the voltage vmeas at the connection point between the capacitor element C and the resistor element R1 as illustrated in FIG. 4 is increased. When the comparator 31 detects that the voltage vmeas becomes equal to or higher than the reference voltage vref, the output signal vdet of the comparator 31 is asserted to a low level. As the increase rate of the voltage VDDVA becomes slower, the voltage vmeas starts to decrease in accordance with the time constant of CR. When the comparator 31 detects that the voltage vmeas becomes equal to or lower than the reference voltage vref, the output signal vdet of the comparator 31 is asserted to a high level. The one-shot pulse generator 35 detects a transition of the output signal vdet to a high level and generates the pulse signal pulse. The pulse signal pulse may be supplied to the flip-flops 27-1 to 27-3 illustrated in FIG. 2.

Figure 6:
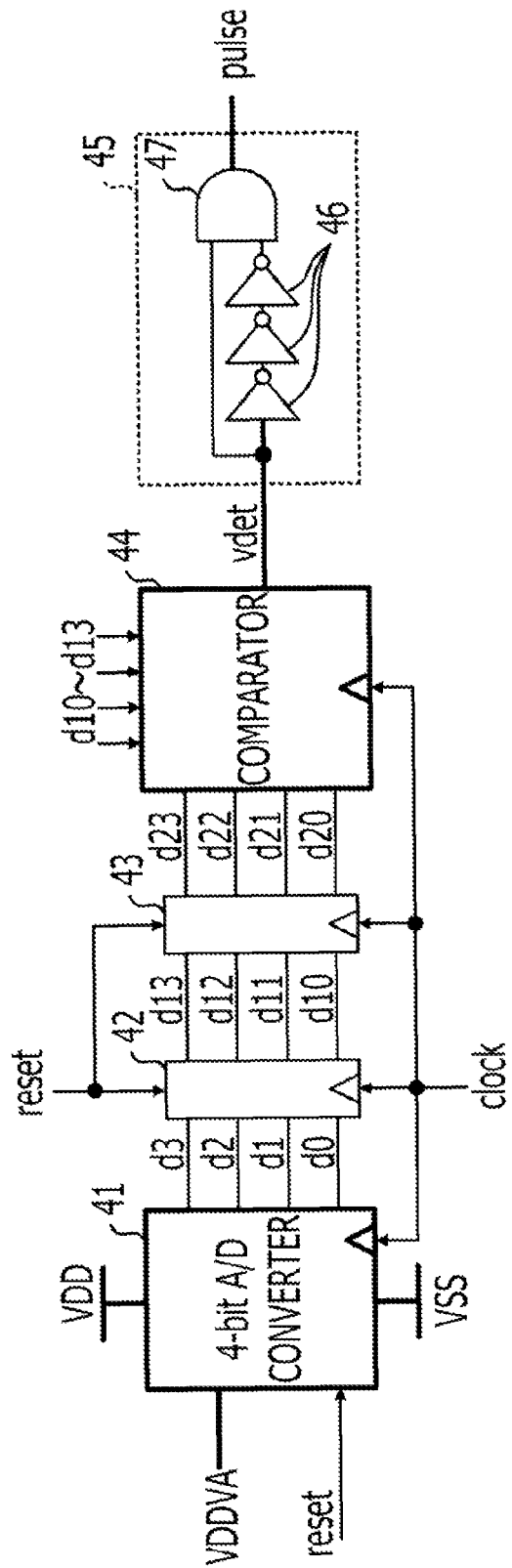
FIG. 6 illustrates an exemplary variation detection circuit.

FIG. 6 illustrates an exemplary variation detection circuit. A variation detection unit 28 illustrated in FIG. 6 includes an Analog to Digital (AD) converter 41, flip-flops 42 and 43, a comparator 44, and a one-shot pulse generator 45. The AD converter 41, the flip-flops 42 and 43, and the comparator 44 may operate in synchronization with a reference clock signal clock. The AD converter 41 converts the analog voltage VDDVA into digital data d0, d1, d2, and d3. The flip-flop 42 delays the individual digital data d0 to d3 by a single clock to generate digital data d10, d11, d12, and d13. The flip-flop 43 delays digital data d10 to d13 by a single clock to generate digital data d20, d21, d22, and d23. The comparator 44 compares the digital data d10 to d13 with the digital data d20 to d23. A signal vdet output from the comparator 44 as the comparison result is asserted to a high level when the digital data d10 to d13 coincide with the digital data d20 to d23, for example. If the digital data do not coincide with one another, the output signal vdet may be asserted to a low level. The one-shot pulse generator 45 includes a plurality of inverters 46 and an AND circuit 47, and generates a pulse signal having a certain width in response to the rising transition of the output signal vdet of the comparator 44. When the reset signal reset, such as the gate control signal a illustrated in FIG. 2, is asserted to a low level, the AD converter 41 is activated and the reset state of the variation detection circuit 28 is released.

Figure 7:
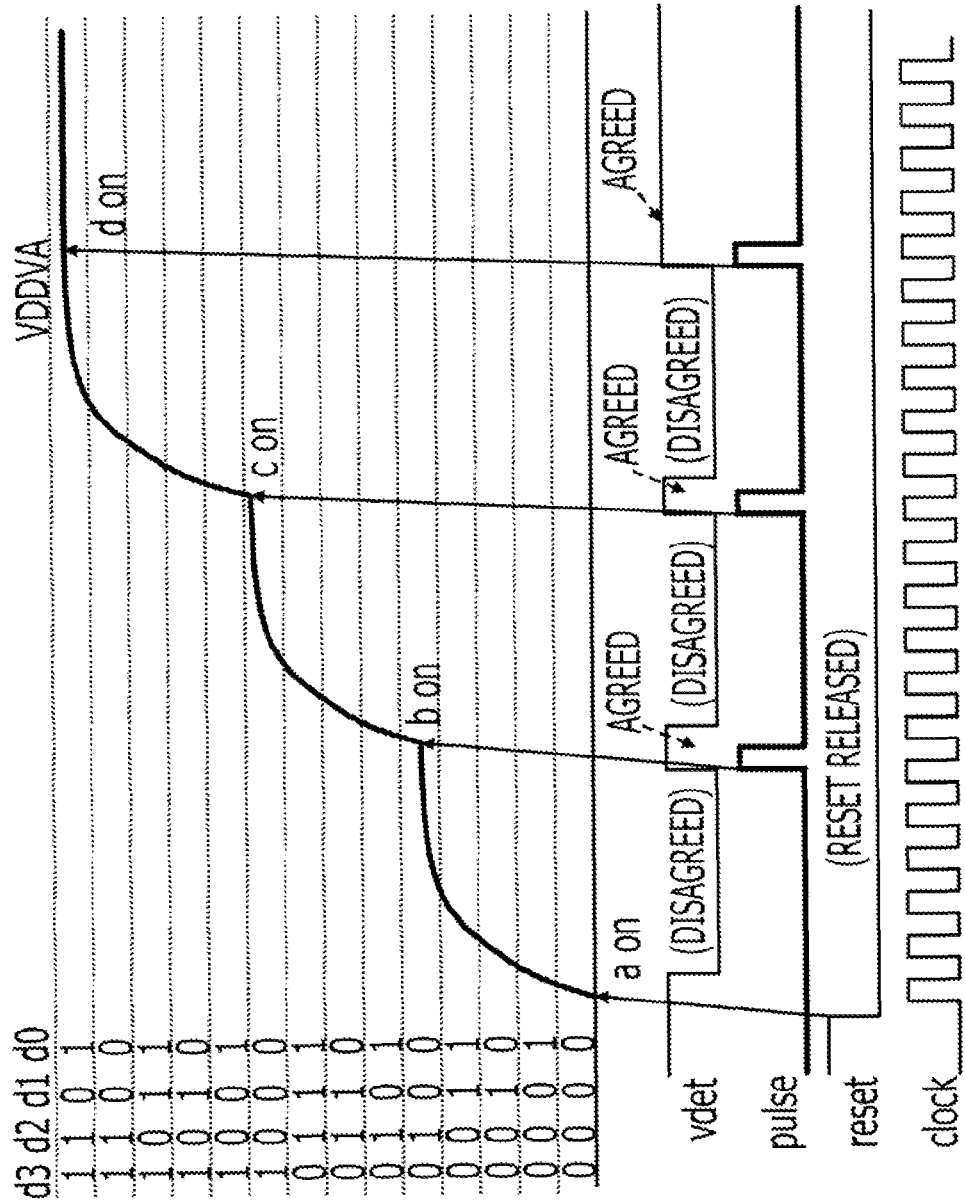
FIG. 7 illustrates an exemplary operation of a variation detection circuit.

FIG. 7 illustrates an exemplary operation of a variation detection circuit. The variation detection circuit may be the variation detection unit 28 illustrated in FIG. 6. When the voltage VDDVA is increased at a high increase rate relative to the time, such as the change rate, the digital data values in consecutive two clock cycles become different from each other. Therefore, the output signal vdet of the comparator 44 is asserted to a low level. As the increase rate of the voltage VDDVA becomes slower, the digital data values in the consecutive two clock cycles coincide with each other so that the output signal vdet of the comparator 44 is asserted to a high level. The one-shot pulse generator 45 detects a transition of the output signal vdet to a high level and generates the pulse signal pulse. The pulse signal pulse may be supplied to the flip-flops 27-1 to 27-3 illustrated in FIG. 2.

Figure 8:
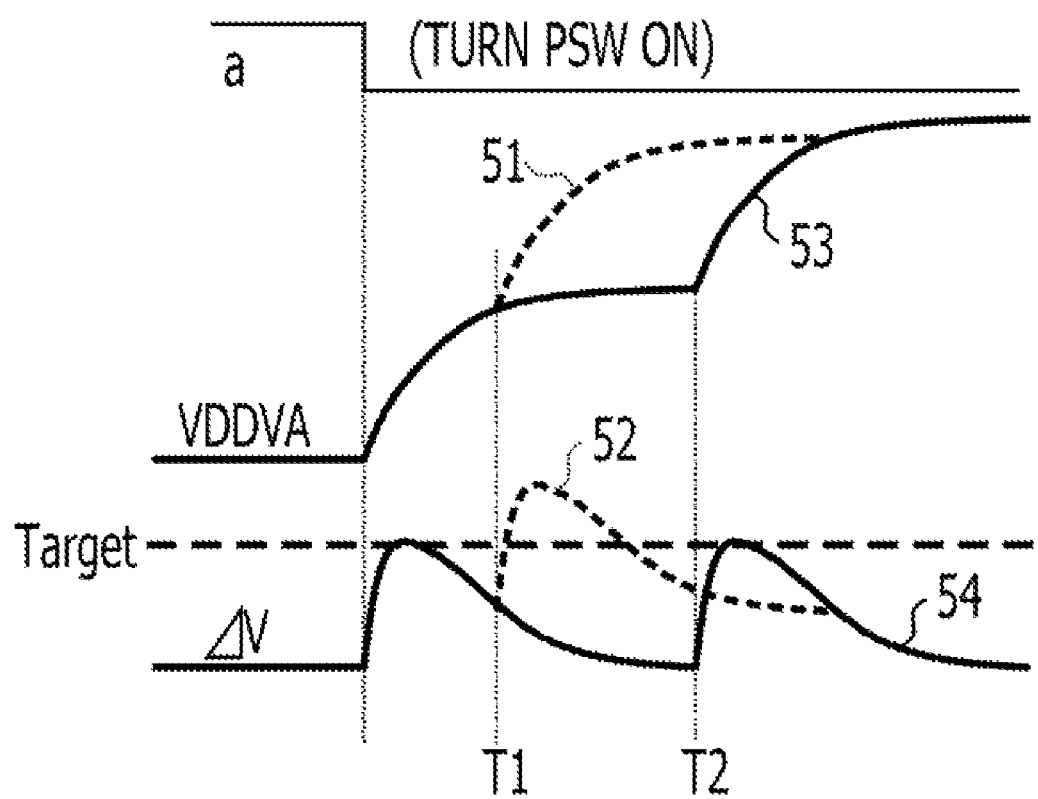
FIG. 8 illustrates an exemplary pulse signal.

FIG. 8 illustrates an exemplary pulse signal. An appropriate value of the interval between the pulse signals pulse may be illustrated. When the pulse signal pulse is generated at time T1 illustrated in FIG. 8 and the PMOS transistor of the subsequent stage is turned on, the voltage VDDVA is changed as a voltage waveform illustrated by a dotted curve 51, for example. When the temporal change rate of an increase in the voltage VDDVA, which depends on the PMOS transistor of the previous stage, is not reduced, the voltage VDDVA starts to increase. The rush current of the subsequent stage may flow into the circuit block 24 in the state where the supply current of the previous stage is not steady. The power noise ΔV may exceed the tolerable upper limit Target as a voltage waveform illustrated by a dotted curve 52. When the pulse signal pulse is generated at time T2 and the PMOS transistor of the subsequent stage is turned on, the voltage VDDVA is changed as a voltage waveform illustrated by a solid curve 53. The voltage VDDVA starts to increase after the temporal change rate of an increase in the voltage VDDVA, which depends on the PMOS transistor of the previous stage, is reduced. The rush current of the subsequent stage may flow into the circuit block 24 after the supply current of the previous stage becomes steady. For example, the value of the power noise ΔV may be equal to or lower than the tolerable upper limit Target as a voltage waveform illustrated by a solid curve 54. Since the power switch of the subsequent stage is turned on when the supply current becomes steady, the power switch is turned on more swiftly than in the case where the transistor is turned on at a fixed time.

Figure 9:
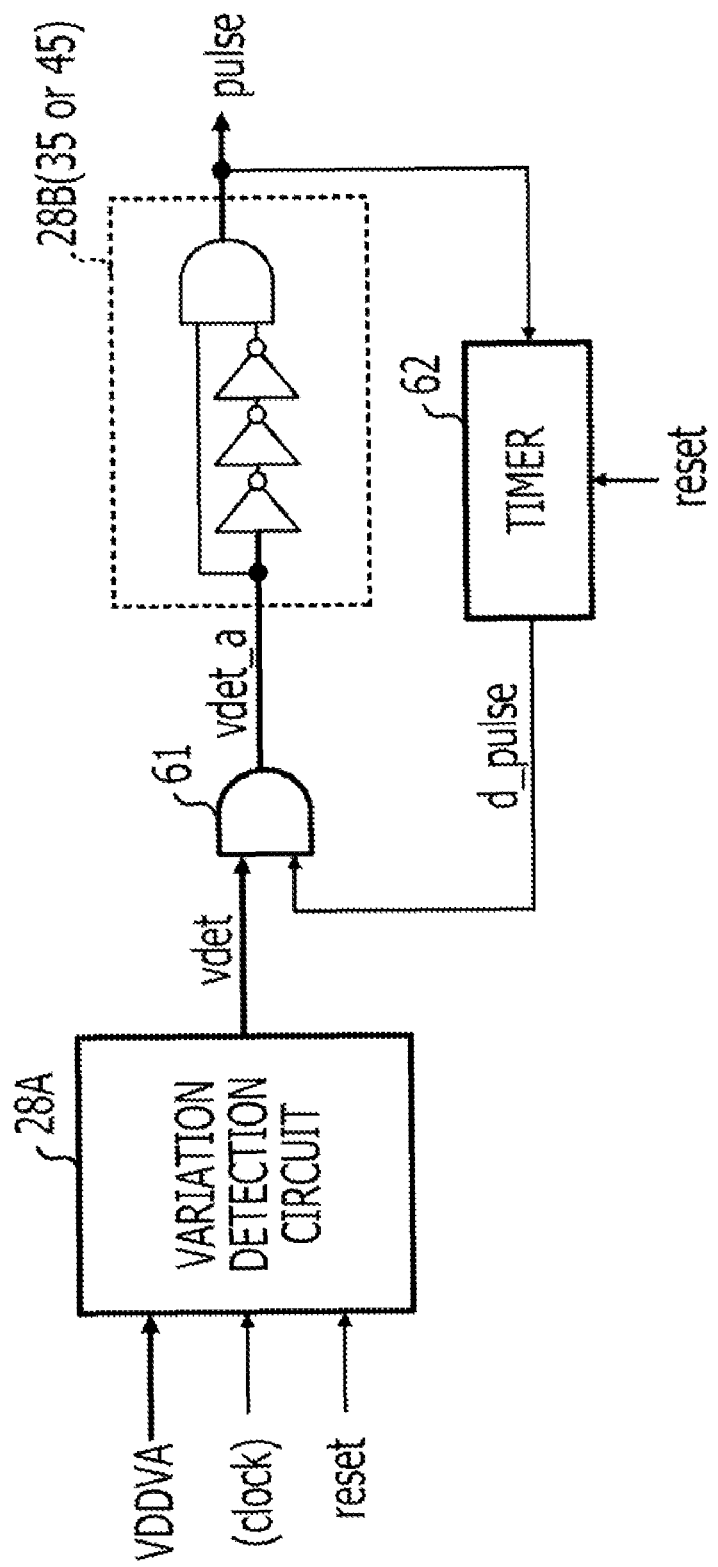
FIG. 9 illustrates an exemplary variation detection circuit.

FIG. 9 illustrates an exemplary variation detection circuit. The variation detection circuit includes a variation detection circuit 28A and a one-shot pulse generator 28B (35). The variation detection circuit 28A may correspond to at least one circuit of the variation detection unit 28 illustrated in FIG. 4 other than the one-shot pulse generator 35. The variation detection circuit illustrated in FIG. 9 may include the variation detection circuit 28A and the one-shot pulse generator 28B (45). The variation detection circuit 28A may correspond to at least one circuit of the variation detection unit 28 illustrated in FIG. 6 other than the one-shot pulse generator 45. The variation detection circuit illustrated in FIG. 9 includes an AND circuit 61 and a timer 62. When the detection result signal vdet of the variation detection circuit 28A indicates the steady state of a current for a certain time period or more, the AND circuit 61 and the timer 62 may generate the pulse signal pulse by compulsion.

Figure 10:
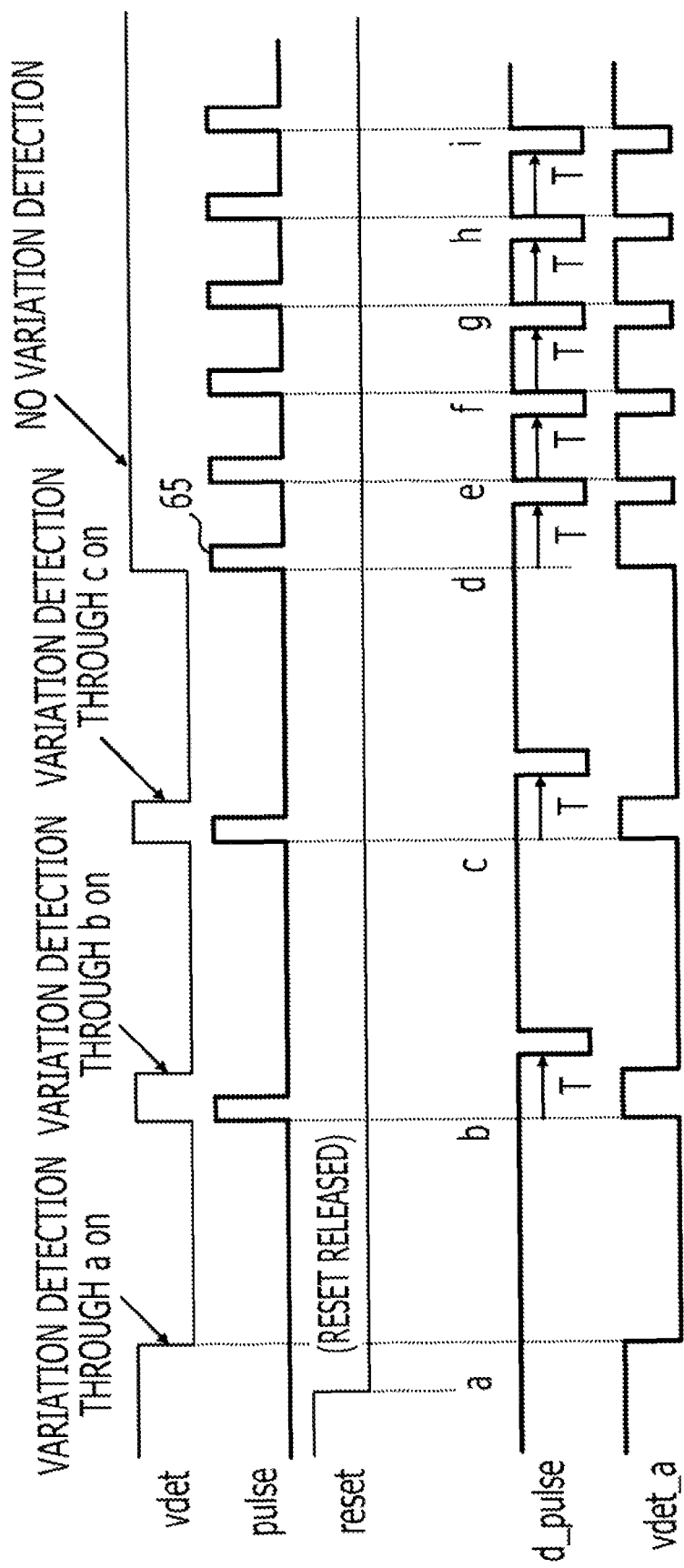
FIG. 10 illustrates an exemplary operation of a variation detection circuit.

FIG. 10 illustrates an exemplary operation of a variation detection circuit. The variation detection circuit may be the circuit illustrated in FIG. 9. If a plurality of power switches, such as the PMOS transistors 26-1 to 26-4 illustrated in FIG. 2, become conductive, a pulse signal 65 may occur. Although another power switch is turned on in response to the pulse signal 65, power noise due to the turning-on of the another power switch may not occur because a sufficient number of power switches become conductive. For example, the voltage VDDVA may not be increased. The output signal vdet of the variation detection circuit 28A is maintained at a high level. In the variation detection circuit 28 illustrated in FIG. 4 or FIG. 6, the power switch of the subsequent stage or later may not be turned on. When the VDDVA is not increased, many of the power switches may not be turned on. When the current consumed by the circuit block 24 is increased, an additional power switch may be turned on because the current supply is needed.

If a pulse signal pulse is applied to the timer 62 in FIG. 9, the timer 62 generates a negative pulse signal d_pulse with a delay of time T illustrated in FIG. 10. The AND circuit 61 performs AND process on the output signal vdet of the variation detection circuit 28A and the negative pulse signal d_pulse. When the output signal vdet is maintained at the high level until at least the time T has elapsed from the occurrence of the pulse signal pulse, the output signal vdet_a of the AND circuit 61 rises to a high level after temporarily falling to a low level. The one-shot pulse generator 28B generates a high pulse signal in response to the rise to a high level. When the detection result signal vdet of the variation detection circuit 28A indicates the steady state of a current for at least a certain time period without interruption, a pulse signal pulse is generated so that a non-conducting power switch is brought into conduction.

Figure 11:
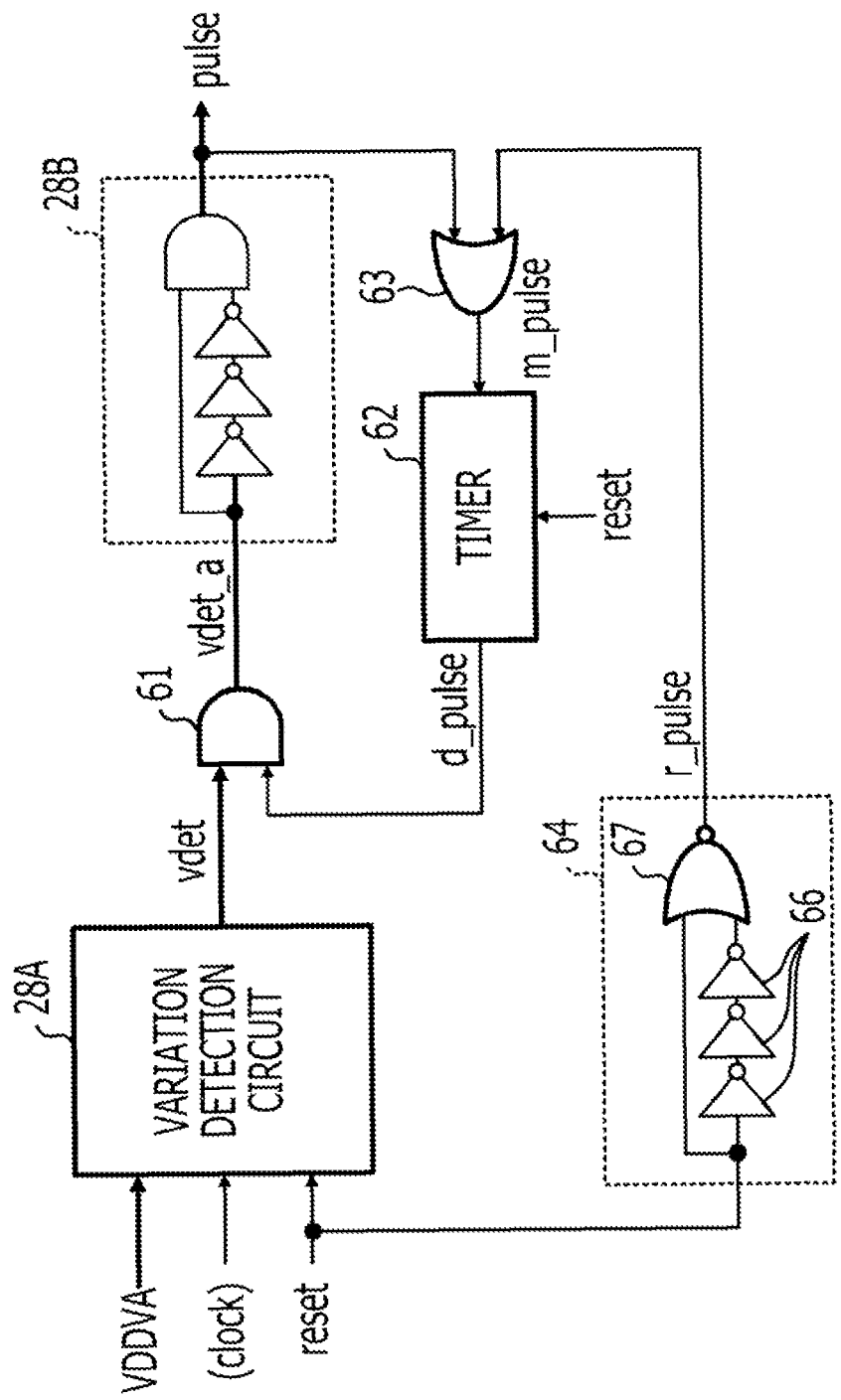
FIG. 11 illustrates an exemplary variation detection circuit.

FIG. 11 illustrates an exemplary variation detection circuit. In FIG. 11, substantially the same elements as those illustrated in FIG. 9 are designated by the same reference numerals and the descriptions thereof are omitted or reduced. The variation detection circuit illustrated in FIG. 11 includes an OR circuit 63 and a one-shot pulse generator 64. The one-shot pulse generator 64 includes a plurality of inverters 66 and a NOR circuit 67, and generates a high pulse signal in response to the falling edge of a reset signal reset. The high pulse signal generated by the one-shot pulse generator 64 is applied to the timer 62 via the OR circuit 63.

Figure 12:
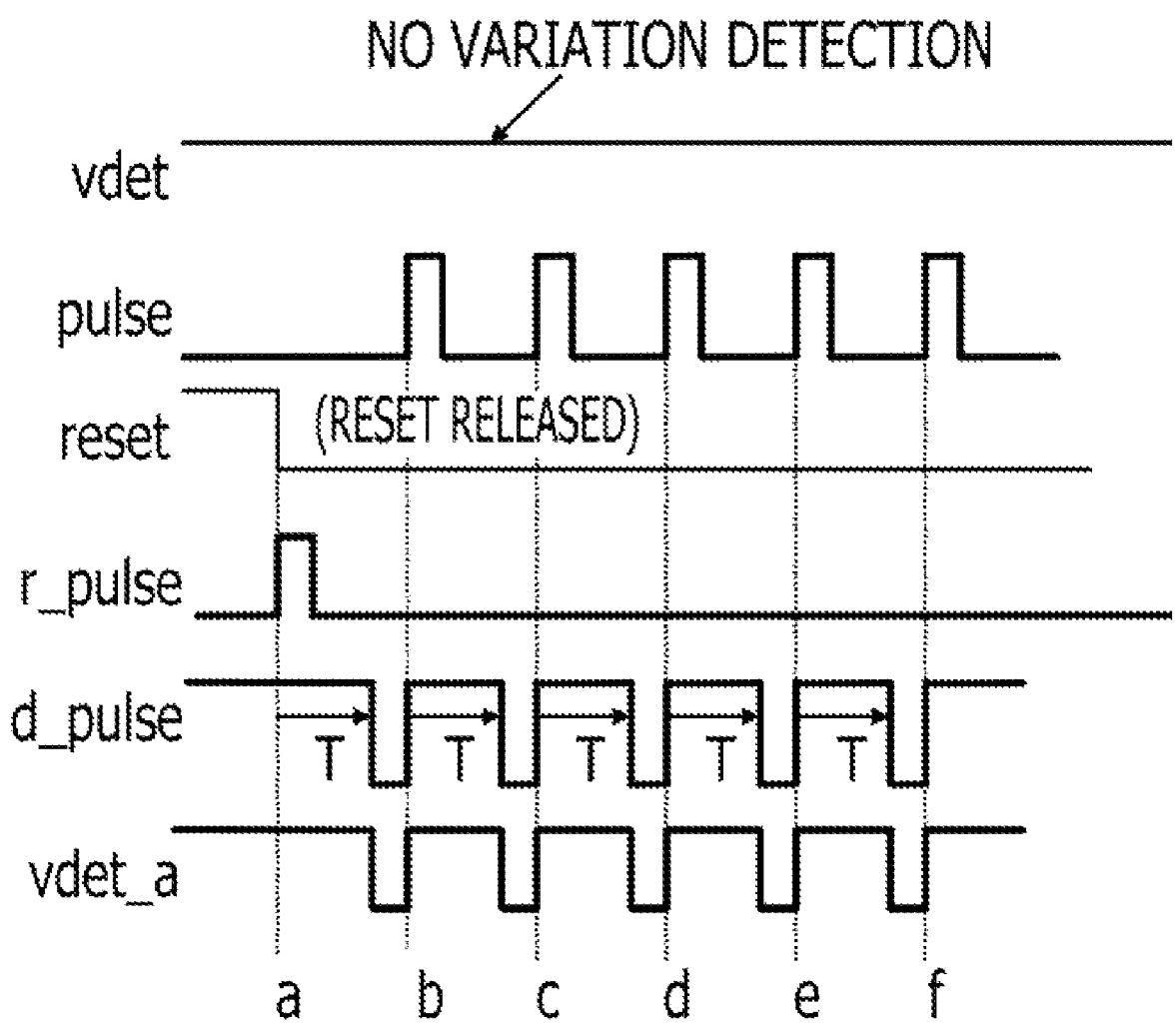
FIG. 12 illustrates an exemplary operation of a variation detection circuit.

FIG. 12 illustrates an exemplary operation of a variation detection circuit. The time chart illustrated in FIG. 12 may be that of the circuit illustrated in FIG. 11. In FIG. 12, when the reset signal reset is asserted to a low level and the reset is released, the output signal vdet of the variation detection circuit 28A may not change to a low level. When the PMOS transistor 26-1 of the first stage illustrated in FIG. 2 is turned on, the current value of the voltage VDDVA may not be increased any more. For example, when the power shutdown state continues for a short time and the internal capacitance of the circuit block 24 and electric charges inside the stabilization capacitor 25 are sufficient, the power management unit 23 may issue the power supply instruction.

In FIG. 11, the one-shot pulse generator 64 generates a high pulse signal in response to the falling edge of the reset signal reset. The high pulse signal generated by the one-shot pulse generator 64 is applied to the timer 62 via the OR circuit 63. When the output signal vdet is maintained at the high level until at least the time T has elapsed from the reset release, the output signal vdet_a of the AND circuit 61 temporarily falls to a low level, and then rises to a high level. The one-shot pulse generator 28B generates a high pulse signal in response to the rise to a high level. When the detection result signal vdet of the variation detection circuit 28A indicates the steady state of current for at least a certain time period without interruption, a non-conducting power switch may be brought into conduction by generating a pulse signal pulse.

Figure 13:
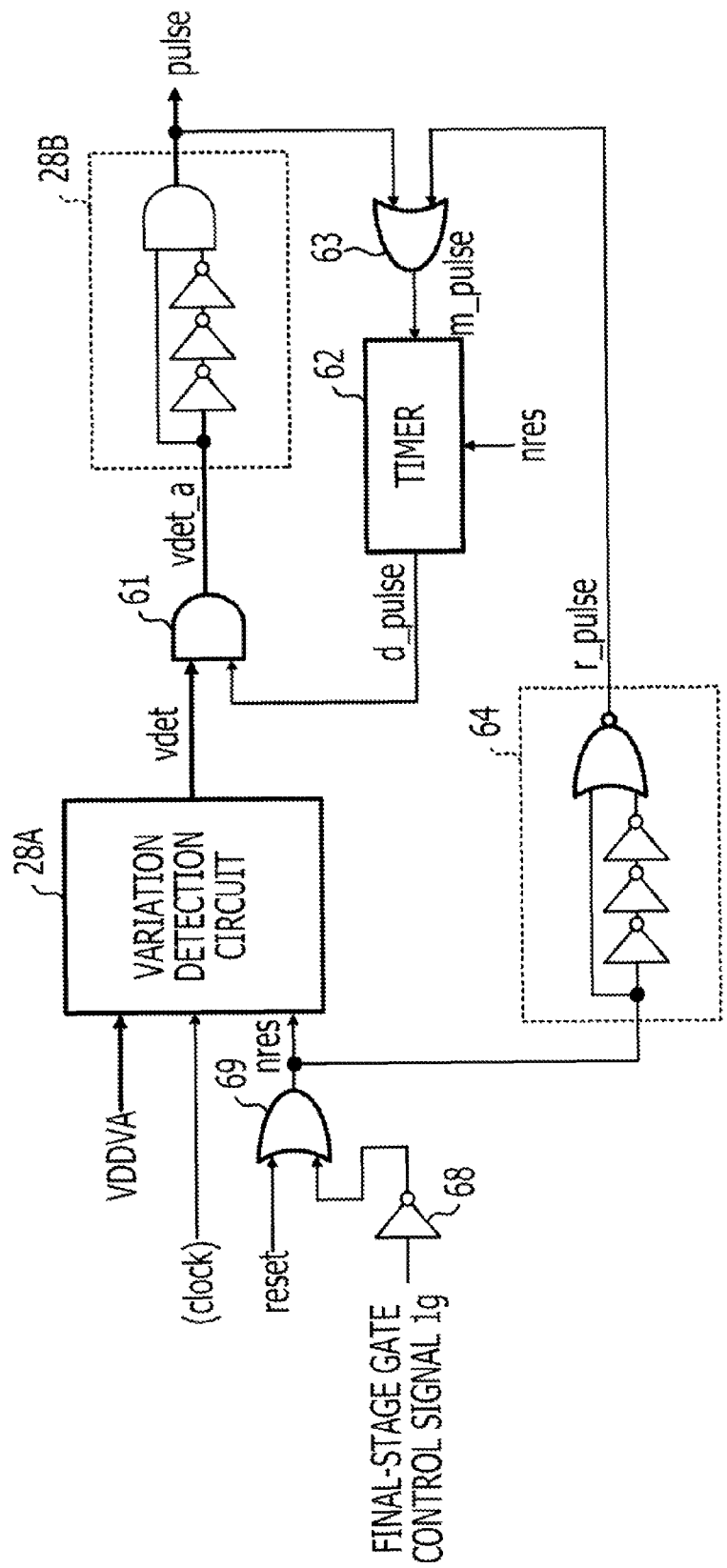
FIG. 13 illustrates an exemplary variation detection circuit.

FIG. 13 illustrates an exemplary variation detection circuit. In FIG. 13, substantially the same elements as those illustrated in FIG. 11 are designated by the same reference numerals and the descriptions thereof is omitted or reduced. The variation detection circuit illustrated in FIG. 13 includes an inverter 68 and an OR circuit 69. A gate control signal 1g of the final stage of the PMOS transistors 26-1, 26-2, and so forth that are illustrated in FIG. 2 is supplied to the inverter 68. For example, when the fourth stage is the final stage, a gate control signal d is supplied to the inverter 68. An output signal of the inverter 68 is applied to the reset input of the variation detection circuit 28A via the OR circuit 69 and is supplied to the one-shot pulse generator 64.

Figure 14:
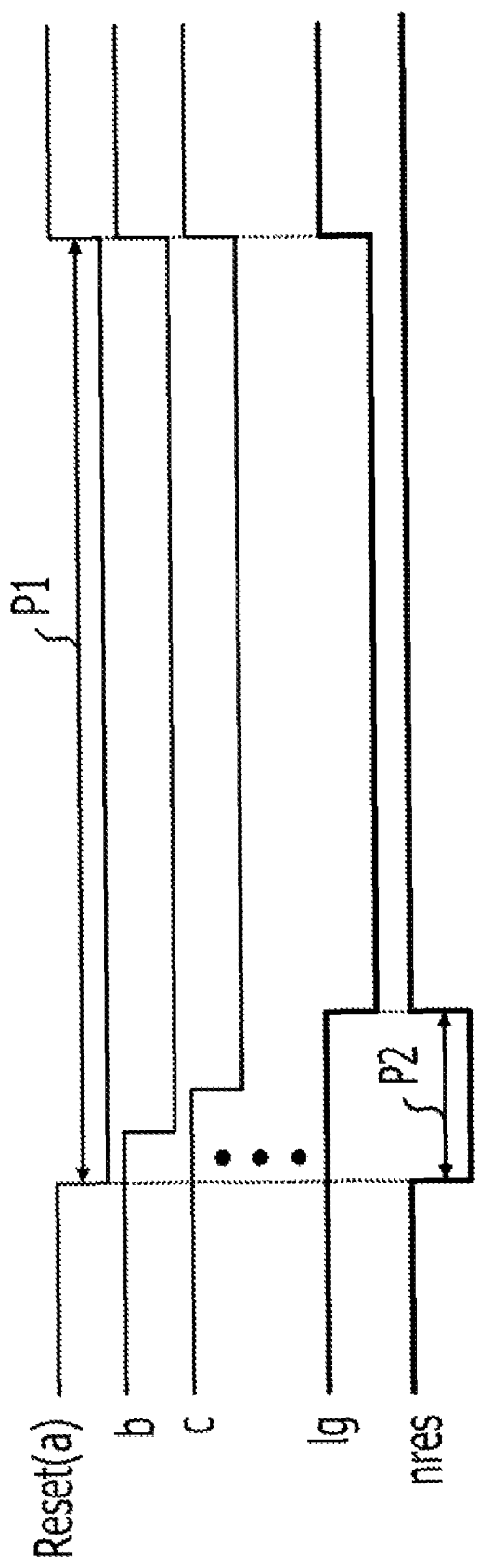
FIG. 14 illustrates an exemplary operation of a variation detection circuit.

FIG. 14 illustrates an exemplary operation of a variation detection circuit. A time chart illustrated in FIG. 14 may be that of the circuit illustrated in FIG. 13. In FIG. 12, the reset signal reset controlled by the power management unit 23, such as the gate control signal a, is asserted to a low level for a time period P1 and the variation detection circuit enters the reset release state. In FIG. 11, for example, the variation detection circuit 28 may continue operating during the reset release state so that operation currents are consumed. In FIG. 13, a reset signal applied to the variation detection circuit 28A may be an output signal nres of the OR circuit 69. The reset signal nres is asserted to a low level for a time period P2 which is shorter than the time period P1 as illustrated in FIG. 14 and the variation detection circuit 28A enters the reset release state. The power switch of the final stage is turned on, which may reduce the current consumption.

Figure 15:
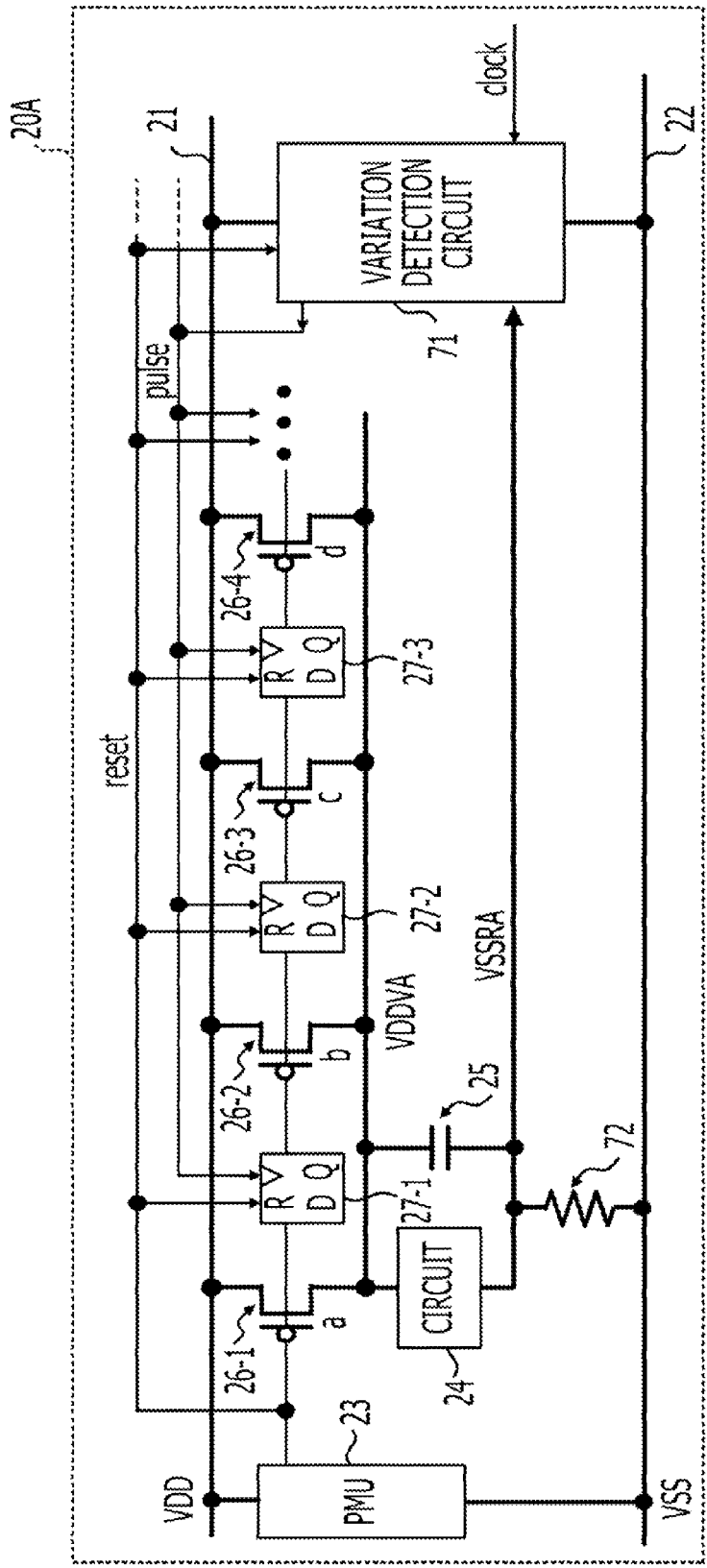
FIG. 15 illustrates exemplary power supply control.

FIG. 15 illustrates an exemplary semiconductor device. The semiconductor device illustrated in FIG. 15 controls the power supply for a circuit block. In FIG. 15, substantially the same elements as those illustrated in FIG. 2 are designated by the same reference numerals and the descriptions thereof is omitted or reduced. In the semiconductor device illustrated in FIG. 15, a resistor element 72 configured to detect a current is provided between the circuit block 24, the stabilization capacitor 25, and the low-side power wiring 22. A variation detection circuit 71 detects the voltage difference between both ends of the current detection-resistor element 72, such as a fall voltage generated by the current detection-resistor element 72. Further, the variation detection circuit 71 outputs a signal corresponding to whether or not the value of the temporal change rate of a current flowing through an internal circuit such as the circuit block 24 and the stabilization capacitor 25 is equal to or smaller than a certain value, as the detection result. When a current flowing through the PMOS transistor corresponding to a power switch becomes steady, the power noise ΔV caused by a rush current disappears. Consequently, the subsequent PMOS transistor may become conductive. In FIG. 15, the variation detection circuit 71 asserts an output signal pulse when the value of the temporal change rate of the fall voltage generated by the current detection-resistor element 72, such as the temporal change rate of a current flowing through the internal circuit becomes equal to or smaller than a certain value.

Figure 16:
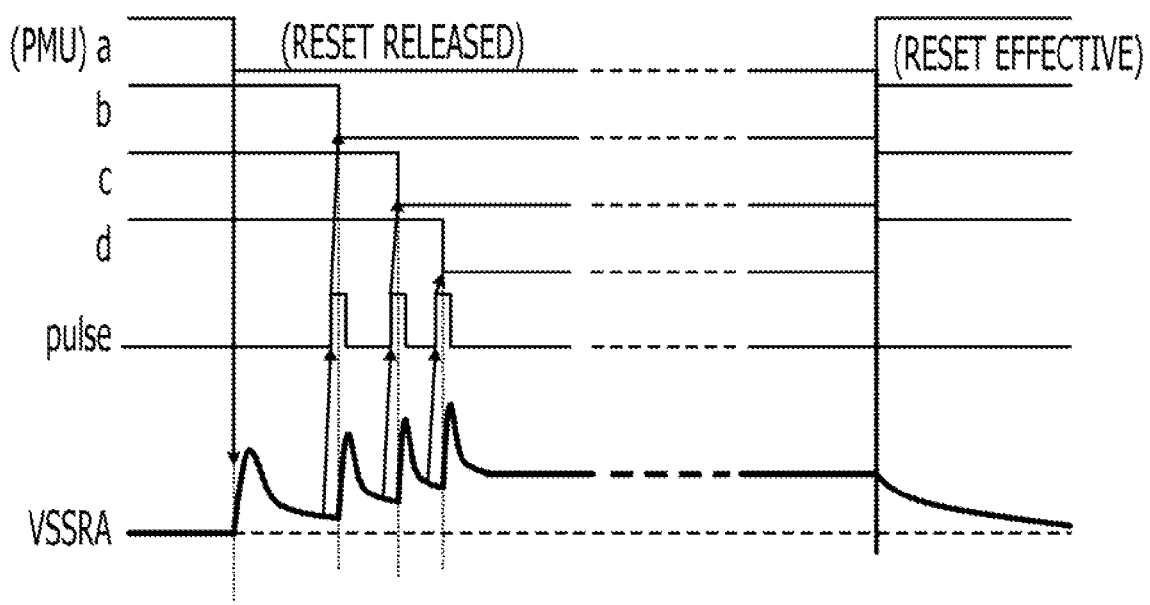
FIG. 16 illustrates an exemplary variation detection circuit.

FIG. 16 illustrates an exemplary operation of a variation detection circuit. A time chart illustrated in FIG. 16 may indicate an operation which starts the power supply to the circuit block illustrated in FIG. 15. When the circuit block 24 is in the power shutdown state, the power management unit 23 asserts the gate control signal to a low level. The PMOS transistor 26-1 is brought into conduction based on the low gate control signal a, and the flip-flops 27-1 to 27-3 and the variation detection circuit 28 are activated. A current flowing through the conducting PMOS transistor 26-1 causes the voltage VSSRA corresponding to the voltage difference between both ends of the current detection-resistor element 72 to increase. A change in the voltage VSSRA may be proportional to a change in the current flowing through the PMOS transistor 26-1. For example, the voltage VSSRA is increased at the outset due to the contribution of a rush current illustrated in FIG. 16, such as a charge current. When the rush current including, for example, the charge current disappears, a steady-state current flows. The steady-state current may not contribute to the power noise. The variation detection circuit 71 detects that the amount of a temporal change in the voltage VSSRA becomes equal to or smaller than a certain amount, and generates a one-shot detection pulse signal pulse. The flip-flop 27-1 asserts the gate control signal b to a low level in response to the pulse signal pulse and the PMOS transistor 26-2 of the subsequent stage is brought into conduction. Another rush current for charging the circuit block 24 starts to flow and the voltage VSSRA is increased. A change in the voltage VSSRA may be proportional to a change in the sum of currents flowing through the PMOS transistors 26-1 and 26-2. The variation detection circuit 71 detects that the amount of the temporal change in the voltage VSSRA becomes equal to or smaller than a certain amount and generates a one-shot detection pulse signal pulse. The flip-flop 27-2 asserts the gate control signal c to a low level in response to the pulse signal pulse and the PMOS transistor 26-3 of the subsequent stage is brought into conduction. The above-described process is repeated until the PMOS transistors having a size, which is appropriate to supply a current consumed by the circuit block 24, are brought into conduction. After that, the power startup is finished.

Figure 17:
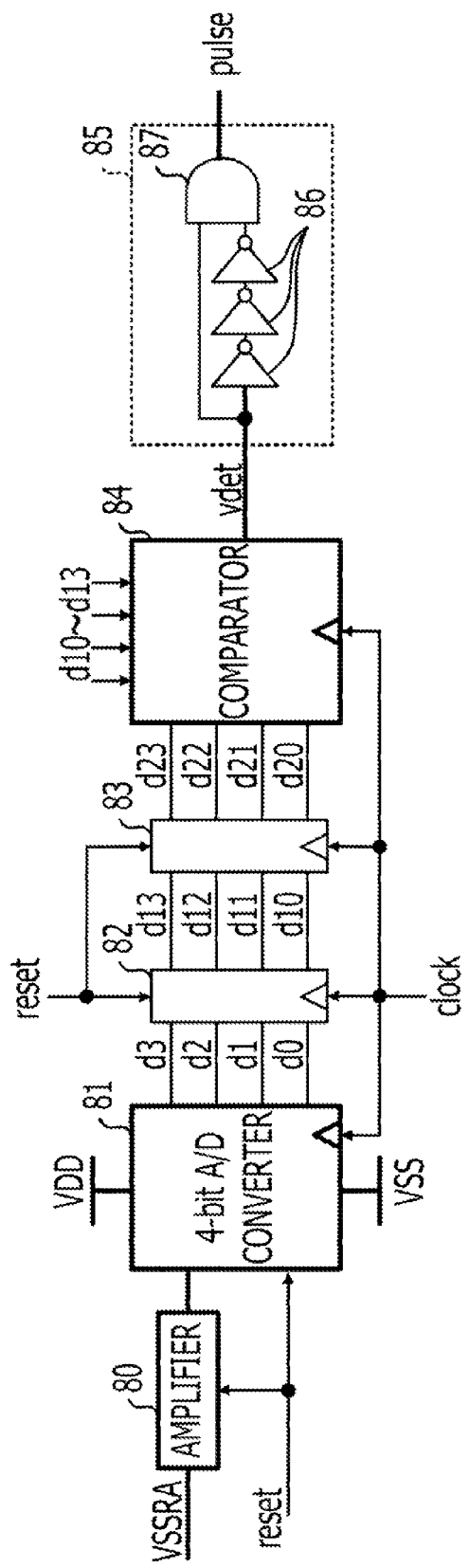
FIG. 17 illustrates an exemplary variation detection circuit.

FIG. 17 illustrates an exemplary variation detection circuit. A variation detection circuit 71 illustrated in FIG. 17 includes an amplifier 80, an AD converter 81, flip-flops 82 and 83, a comparator 84, and a one-shot pulse generator 85. The AD converter 81, the flip-flops 82 and 83, and the comparator 84 may operate in synchronization with a reference clock signal clock. The amplifier 80 amplifies an analog voltage VSSRA. In FIG. 16, when a current, which flows when the circuit block 24 is operating, flows to the current detection resistor element 72, the value of the current detection resistor element 72 may be a resistance of 10 mΩ or around. Since the level variation of the voltage VSSRA is reduced to a few tens of mV or around, the amplifier 80 illustrated in FIG. 17 may amplify the level by a factor of 20, for example, so that the level may vary in the range of the order of 0V to 1V.

The AD converter 81 converts the amplified analog voltage into the digital data d0 to d3. The flip-flop 82 delays digital data d0 to d3 by a single clock to generate digital data d10, d11, d12, and d13. The flip-flop 83 delays digital data d10 to d13 by a single clock to generate digital data d20, d21, d22, and d23. The comparator 84 compares the digital data d10 to d13 with the digital data d20 to d23. A comparison result-output signal vdet of the comparator 84 may be asserted to a high level when the digital data d10 to d13 coincide with the digital data d20 to d23, for example. Otherwise, the comparison result-output signal vdet may be asserted to a low level. The one-shot pulse generator 85 includes a plurality of inverters 86 and an AND circuit 87, and generates a pulse signal having a certain width in response to the rising transition of the output signal vdet of the comparator 84. When the reset signal reset, such as the gate control signal an illustrated in FIG. 2, is asserted to a low level, the amplifier 80 and the AD converter 81 are activated and the reset state of the variation detection circuit 71 is released.

Figure 18:
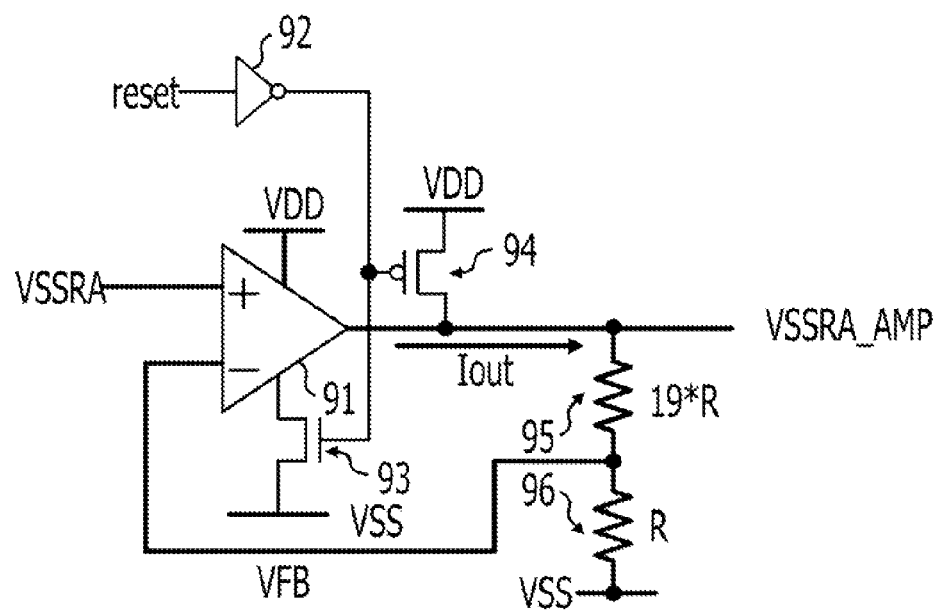
FIG. 18 illustrates an exemplary amplifier.

FIG. 18 illustrates an exemplary amplifier. The amplifier 80 illustrated in FIG. 18 includes a calculation amplifier 91, an inverter 92, an NMOS transistor 93, a PMOS transistor 94, and resistor elements 95 and 96. For example, the resistance value of the resistor element 95 may be 19R which is nineteen times larger than the resistance value R of the resistor element 96. The value of a feedback voltage VFB may be one-twentieth of that of an amplified voltage VSSRA_AMP through the resistance division of the resistor elements 95 and 96. The calculation amplifier 91 outputs the voltage VSSRA_AMP so that the feedback voltage VFB becomes substantially equal to an input voltage VSSRA. The output voltage VSSRA_AMP may be amplified to be about twenty times larger than the input voltage VSSRA.

Figure 19:
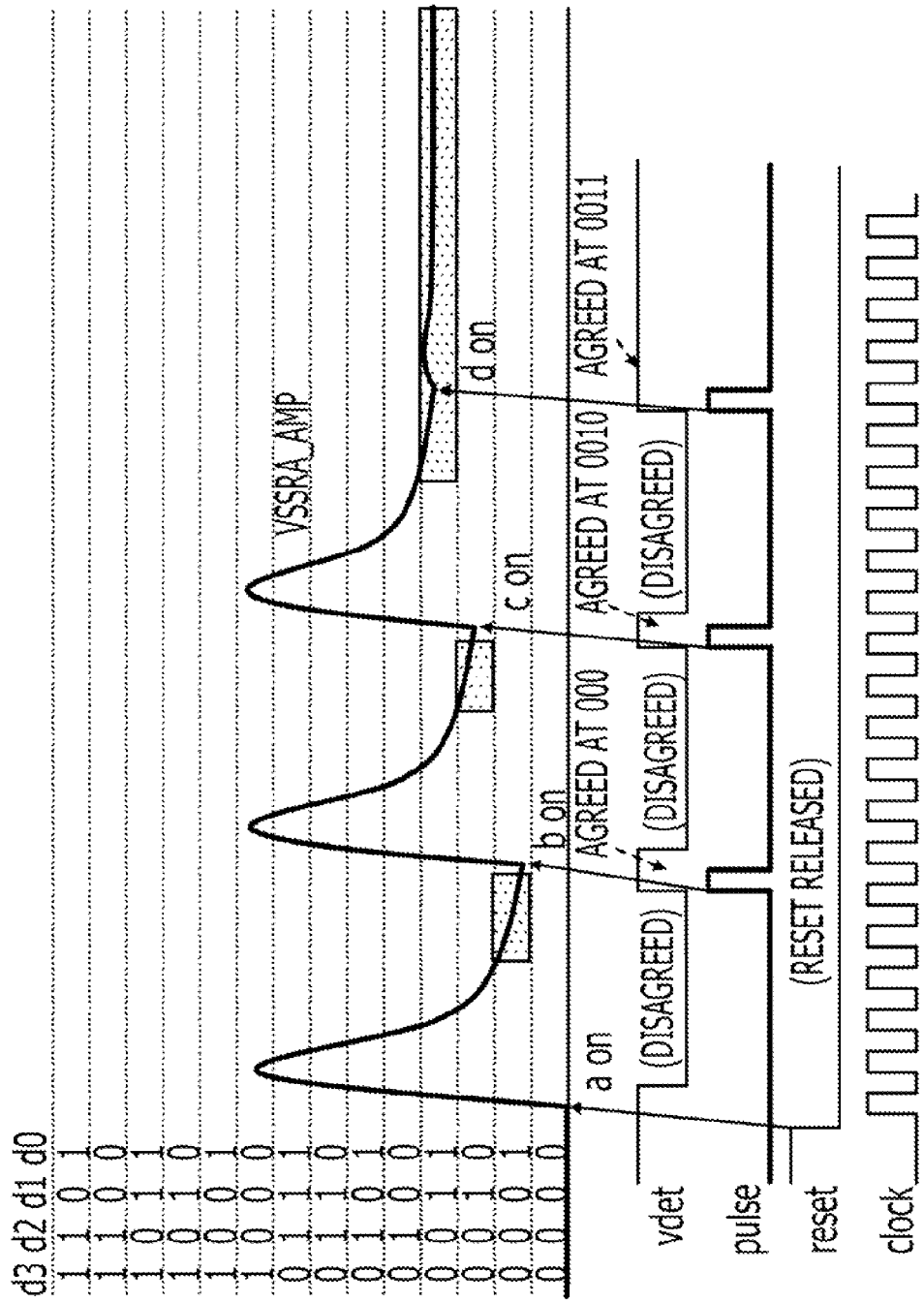
FIG. 19 illustrates an exemplary operation of a variation detection circuit.

FIG. 19 illustrates an exemplary operation of a variation detection circuit. The time chart illustrated in FIG. 19 may be that of the variation detection circuit 71 illustrated in FIG. 17. When the voltage VSSRA_AMP is changed at a high change rate relative to the time, the digital data in consecutive two clock cycles are different from each other. Therefore, the output signal vdet of the comparator 84 may be asserted to a low level. As the change rate of the voltage VSSRA_AMP becomes slower, the digital data in the consecutive two clock cycles coincide with each other so that the output signal vdet of the comparator 84 may be asserted to a high level. The one-shot pulse generator 85 detects a transition of the output signal vdet to a high level and generates the pulse signal pulse which is output to the flip-flops 27-1 to 27-3 illustrated in FIG. 15.

The variation detection circuit 71 illustrated in FIG. 17 produces effects that are substantially the same as or similar to those illustrated in FIGS. 9 to 14.

Figure 20:
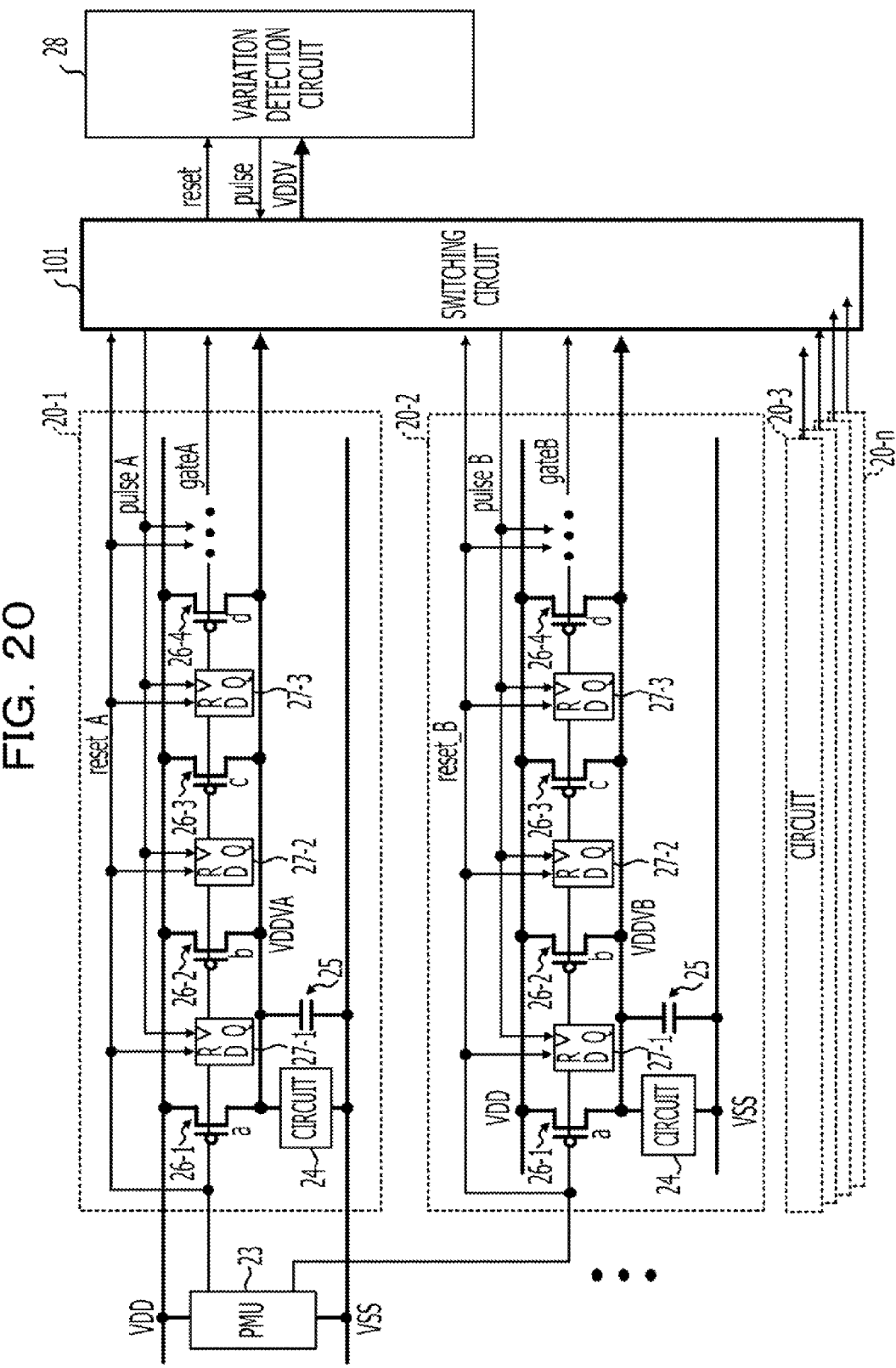
FIG. 20 illustrates an exemplary semiconductor device.

FIG. 20 illustrates an exemplary semiconductor device. In FIG. 20, substantially the same elements as those illustrated in FIG. 2 are designated by the same reference numerals and the descriptions thereof is omitted or reduced. In FIG. 20, each of the circuit units 20-1 to 20-$n$ includes the circuit block 24, the stabilization capacitor 25, the PMOS transistors 26-1 to 26-4, and the flip-flops 27-1 to 27-3. For example, the plurality of circuit blocks 24 is provided and each of the circuit blocks 24 includes the PMOS transistors 26-1 to 26-4 and the flip-flops 27-1 to 27-3 for controlling the power supply. The single power management unit 23 is provided for the entire semiconductor device.

Since an area of the variation detection circuit 28 is large, the variation detection circuit 28 may be shared among a plurality of the circuit blocks. The variation detection circuit 28 operates when the circuit is shifted from the power shutdown state to the power supply state, and the plurality of circuit blocks which shuts down the power is not turned on contemporaneously to reduce the power noise. Therefore, the variation detection circuit 28 may be shared. A switching circuit 101 may be provided to share the variation detection circuit 28. In FIG. 20, the variation detection circuit 28 is shared among the circuit blocks. The variation detection circuit 71 illustrated in FIG. 17 may be shared among the circuit blocks.

FIG. 21 illustrates an exemplary switching circuit. The switching circuit 101 illustrated in FIG. 21 includes a switch circuit 111, inverters 112 to 114, OR circuit 115 and 116, an AND circuit 117, and NOR circuits 118 and 119. The switching circuit 101 illustrated in FIG. 21 may switch between the circuit unit 20-1 and the circuit unit 20-2. In the circuit unit 20-1, the OR circuit 115 calculates an OR logic nresA between a reset signal reset_A and the inverted logic of a gate control signal gateA of the power switch of the final stage. The OR logic nresA having a low level indicates that the circuit unit 20-1 is being shifted from the power shutdown state to the power supply state. An OR logic nresB having a low level indicates that the circuit unit 20-2 is being shifted from the power shutdown state to the power supply state. The switch circuit 111 is controlled by the OR logic nresA and the OR logic nresB so that either the voltage VDDVA of the circuit unit 20-1 or the voltage VDDVB of the circuit unit 20-2 is selected and a detection object voltage VDDV is supplied to the variation detection circuit 28. When the OR logic nresA is at a low level, a pulse signal pulse generated by the variation detection circuit 28 is supplied to the circuit unit 20-1 as a pulse signal pulse_A. When the OR logic nresB is at a low level, the pulse signal pulse generated by the variation detection circuit 28 is supplied to the circuit unit 20-2 as a pulse signal pulse_B.

FIG. 22 illustrates an exemplary operation of a switching circuit and a variation detection circuit. The switching circuit 101 illustrated in FIG. 21 or the variation detection circuit 28 illustrated in FIG. 20 may perform the operations that are illustrated in FIG. 22. The signal nresA may be at a low level during the time period where the circuit unit 20-1 is shifted from the power OFF state to the power ON state and may be at a high level during a different time period. The signal nresB may be at a low level during the time period where the circuit unit 20-2 is shifted from the power OFF state to the power ON state and may be at a high level during a different time period. The signals nresA and nresB may not be at a low level contemporaneously.

The switching circuit 101 sets the reset signal reset of the variation detection circuit 28 to a low level in response to the low-level signal nresA and activates the variation detection circuit 28. The switching circuit 101 supplies the voltage VDDVA to the variation detection circuit 28 as the detection object voltage VDDV. The variation detection circuit 28 detects a change in the voltage VDDV and generates a pulse signal pulse. The switching circuit 101 may supply the pulse signal pulse to the circuit unit 20-1 as the pulse signal pulse_A. The switching circuit 101 sets the reset signal reset of the variation detection circuit 28 to a low level in response to the low-level signal nresB and activates the variation detection circuit 28. The switching circuit 101 supplies the voltage VDDVB to the variation detection circuit 28 as the detection object voltage VDDV. The variation detection circuit 28 detects a change in the voltage VDDV and generates the pulse signal pulse. The switching circuit 101 may supply the pulse signal pulse to the circuit unit 20-2 as the pulse signal pulse_B. The power ON operation of the circuit block 24 of each of the plurality of circuit units may be managed by the single variation detection unit 28.

In the above-described embodiment, the PMOS transistor is used as a power switch. An NMOS transistor may be inserted between the circuit block and a ground power line and the NMOS transistor may be used as the power switch. In the above-described embodiment, the power switches are sequentially turned by one by. When the value of the power noise falls within a tolerable range, at least two power switches may be contemporaneously turned on for a single ON operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A semiconductor device comprising:
    an internal circuit;
    a plurality of power switches arranged in parallel configured to supply current to the internal circuit;
    an instruction circuit configured to output an instruction signal for controlling power supply to the internal circuit;
    a variation detection circuit configured to detect the current and to output a detection result; and
    a logic circuit configured to control a timing for when the plurality of power switches enter a conducting state in accordance with the detection result and the instruction signal.

2. The semiconductor device according to claim 1,
    wherein the instruction circuit brings at least one of the plurality of power switches into the conducting state, and
    wherein the logic circuit makes at least one of the plurality of power switches that is not in the conducting state enter the conducting state when the detection result indicates changes from a non-steady state to a steady state.

3. The semiconductor device according to claim 2, wherein the logic circuit is activated based on the instruction signal and increases a number of the power switches which are in the conducting state when the detection result indicates a steady state over a certain time period.

4. The semiconductor device according to claim 1, wherein the variation detection circuit is activated based on the instruction signal.

5. The semiconductor device according to claim 4, wherein the variation detection circuit is deactivated when each of the plurality of power switches enters the conducting state.

6. The semiconductor device according to claim 1, wherein at least one of the plurality of power switches enters a non-conducting state based on the instruction signal.

7. The semiconductor device according to claim 1, wherein the variation detection circuit outputs a signal related to a temporal change rate of the current flowing through the internal circuit as the detection result.

8. The semiconductor device according to claim 1, wherein the variation detection circuit outputs a signal related to a temporal change rate of a voltage charged to the internal circuit is output as the detection result.

9. The semiconductor device according to claim 1,
    wherein the internal circuit includes a first internal circuit and a second internal circuit,
    wherein the plurality of power switches and the logic circuit are independently provided for each of the first internal circuit and the second internal circuit, and
    wherein the variation detection circuit is shared between the first internal circuit and the second internal circuit.

10. A power control method for a semiconductor device comprising:
    outputting an instruction signal for controlling power supply to an internal circuit;
    making at least one of a plurality of power switches arranged in parallel enter a conducting state based on the instruction signal;
    detecting current supplied to the internal circuit after changing a conductive state of the at least one of the plurality of power switches;
    outputting a detection result of the current; and
    making at least one power switch of the plurality of power switches which is in a non-conducting state enter the conducting state when the detection result indicates a steady state.

11. The power control method according to claim 10, wherein,
    at least one of the plurality of power switches enters the conducting state based on the instruction signal, and
    at least one of the plurality of power switches which is in the non-conducting state enters the conducting state when the detection result indicates the steady state.

12. The power control method according to claim 11, further comprising:

increasing a number of power switches which are in the conducting state when the detection result indicates the steady state over a certain time period.

13. The power control method according to claim 10, further comprising
outputting a signal related to a temporal change rate of the current flowing through the internal circuit as the detection result.

14. The power control method according to claim 10, further comprising
outputting a signal related to a temporal change rate of a voltage charged to the internal circuit as the detection result.

* * * * *